United States Patent
Baracca et al.

(10) Patent No.: US 12,531,702 B2
(45) Date of Patent: Jan. 20, 2026

(54) DYNAMIC TRANSMISSION CONFIGURATION INDICATOR ACTIVATION

(71) Applicant: NOKIA TECHNOLOGIES OY, Espoo (FI)

(72) Inventors: Paolo Baracca, Munich (DE); Rafael Cauduro Dias De Paiva, Aalborg (DK); Riikka Karoliina Dimnik, Kirkkonummi (FI); Samantha Caporal Del Barrio, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/056,701

(22) Filed: Feb. 18, 2025

(65) Prior Publication Data

US 2025/0266966 A1    Aug. 21, 2025

(30) Foreign Application Priority Data

Feb. 19, 2024 (FI) .................................. 20245198

(51) Int. Cl.
*H04B 7/06* (2006.01)
*H04L 5/00* (2006.01)
(Continued)

(52) U.S. Cl.
CPC .......... *H04L 5/0053* (2013.01); *H04L 5/0035* (2013.01); *H04L 5/0085* (2013.01); *H04W 72/231* (2023.01); *H04W 72/563* (2023.01)

(58) Field of Classification Search
CPC .. H04L 5/0053; H04L 5/0035; H04W 72/231; H04B 7/0695
See application file for complete search history.

(56) References Cited

U.S. PATENT DOCUMENTS

2020/0077428 A1*  3/2020  Zhou ................. H04L 5/0023
2023/0007504 A1*  1/2023  Jang ................. H04B 7/0695
(Continued)

FOREIGN PATENT DOCUMENTS

| CN | 117397343 A | 1/2024 |
|---|---|---|
| EP | 4183212 A1 | 5/2023 |

(Continued)

OTHER PUBLICATIONS

3GPP TSG-RAN4 Meetng#99-e, R4-2108788 Title:P_Cmax fix for teh CA capability (Year: 2021).*

(Continued)

*Primary Examiner* — Faruk Hamza
*Assistant Examiner* — Abusayeed M Haque
(74) *Attorney, Agent, or Firm* — ALSTON & BIRD LLP

(57) ABSTRACT

Example embodiments of the disclosure relate to methods, apparatuses, and a computer readable storage medium for dynamic transmission configuration indicator (TCI) activation. In a method, a first apparatus receives a first indication and a second indication. The first indication indicates a first switch from a first TCI state to a first target TCI state is to be performed, and the second indication indicates a second switch from a second source TCI state to a second target TCI state is to be performed. The first source TCI state has been activated for a first network device, and the second source TCI state has been activated for a second network device. Reference signals associated with the first target TCI state and the second target TCI state are adjacent. The first apparatus determines an order for performing the first switch and the second switch.

15 Claims, 13 Drawing Sheets

(51) Int. Cl.
*H04W 72/231* (2023.01)
*H04W 72/563* (2023.01)

(56) References Cited

U.S. PATENT DOCUMENTS

| | | | |
|---|---|---|---|
| 2023/0208598 A1 | 6/2023 | Khoshnevisan et al. | |
| 2024/0015737 A1* | 1/2024 | Raghavan | H04W 16/28 |
| 2024/0039582 A1 | 2/2024 | Shahmohammadian et al. | |
| 2025/0007595 A1* | 1/2025 | Raghavan | H04B 17/318 |
| 2025/0055653 A1* | 2/2025 | Luo | H04L 5/0055 |

FOREIGN PATENT DOCUMENTS

| | | | |
|---|---|---|---|
| WO | 2022/133692 A1 | 6/2022 |
| WO | 2022/240339 A1 | 11/2022 |
| WO | 2023/044778 A1 | 3/2023 |
| WO | 2023/100317 A1 | 6/2023 |
| WO | 2023/137734 A1 | 7/2023 |
| WO | 2024007316 A1 | 1/2024 |
| WO | 2024/035974 A1 | 2/2024 |
| WO | 2025/104513 A1 | 5/2025 |

OTHER PUBLICATIONS

3GPP TSG-RAN4 WG2 Meetng#103bis, R2-1814988 Title: Finalization of ssb-PositioninginBurst mismatch issue (Year: 2018).*
International Search Report and Written Opinion for International Application No. PCT/EP2025/052053, mailed on Apr. 8, 2025, 14 pages.
3GPP TSG-RAN WG4 Meeting #110; R4-2402020; "Discussion on Rel-18 Extension of Unified TCI Framework for mTRP Operation"; Source: Nokia, Nokia Shanghai Bell; Agenda Item: 8.21.2.3; Feb. 26-Mar. 1, 2024; 7 pages.
3GPP TSG-RAN WG4 Meeting #109; R4-2318584; "On RRM Requirements for Unified TCI Framework with mTRP"; Agenda item: 8.29.2.3; Source: Apple; Release: Rel-18; Nov. 13-17, 2023; 9 pages.
Samsung, "Big CR to TS 38.133 on NR MIMO evolution for downlink and uplink", 3GPP TSG-RAN WG4 Meeting # 109, Change Request CR 3953, R4-2321644, (Nov. 13-17, 2023), 23 pages.
"3rd Generation Partnership Project; Technical Specification Group Radio Access Network; NR; Requirements for support of radio resource management (Release 18)", 3GPP TS 38.133 v18.4.0, (Dec. 2023), 6361 pages.
Khoshnevisan et al., "Enhanced Reliability and Capacity with Multi-TRP Transmission", IEEE Communications Standards Magazine, (Mar. 2022), 7 pages.
Nokia et al., "Discussion on Rel-18 extension of Unified TCI framework for mTRP operation", 3GPP TSG-RAN WG4 Meeting #109, R4-2320727, (Nov. 13-17, 2023), 5 pages.
Office Action for Finland Application No. 20245198 dated Sep. 16, 2024, 13 pages.
Samsung, "Ad-hoc minutes on NR_MIMO_evo_DL_UL WI", 3GPP TSG-RAN WG4 Meeting #109, R4-2321329, (Nov. 13-17, 2023), 28 pages.
Samsung, "New WID: MIMO Evolution for Downlink and Uplink", 3GPP TSG RAN Meeting #94e, RP-213598, (Dec. 6-17, 2021), 6 pages.
Samsung, "WF on NR_MIMO_evo_DL_UL WI", 3GPP TSG-RAN WG4 Meeting #109, R4-2321563, (Nov. 13-17, 2023), 6 pages.
Xiaomi, "Discussion on Unified TCI states for FeMIMO", 3GPP TSG-RAN WG4 Meeting #108bis, R4-2315410, (Oct. 9-13, 2023), 7 pages.
Ericsson, "WF for FR2_multiRx_RRM_part3", 3GPP TSG-RAN WG4 Meeting #105, R4-222xxxx, (Nov. 14-18, 2022), 8 pages.
Mediatek, "Moderator summary on extension of unified TCI framework (Round 1)", 3GPP TSG RAN WG1 #112bis-e, Draft R1-2303812, (Apr. 17-26, 2023), 42 pages.
Nokia et al., "On MultiRx TCI state switching requirements", 3GPP TSG-RAN WG4 Meeting #106-bis, R4-2304050, (Apr. 17-26, 2023), 8 pages.
Office Action for Taiwanese Application No. 114105507 dated Sep. 2, 2025, 18 pages.

* cited by examiner

DYNAMIC TRANSMISSION CONFIGURATION INDICATOR ACTIVATION

RELATED APPLICATION

This application claims priority from, and the benefit of, Finnish Application No. 20245198, filed on Feb. 19, 2024, the contents of which is incorporated herein by reference in its entirety.

FIELD

Various example embodiments of the present disclosure generally relate to the field of telecommunication and in particular, to methods, apparatuses and a computer readable storage medium for dynamic transmission configuration indicator (TCI) activation.

BACKGROUND

Relevant technologies of New Radio (NR) have designed a way to indicate beams of different channels and/or reference signals through TCI states. Taking the Physical Downlink Shared Channel (PDSCH) as an example, a set of available TCI states is configured via a RRC configuration. Some TCI states in the set of available TCI states are activated via MAC CE. A TCI state is selected from the activated TCI states and is indicated via a Downlink Control Information (DCI) signaling as spatial reception parameters of the Demodulation Reference Signal (DMRS) for PDSCH.

The activated downlink TCI states may be overlapped or adjacent. In such case, a User Equipment (UE) is not able to do Time/Frequency (T/F) tracking for each of Synchronization Signal/PBCH Blocks (SSBs) after processing the MAC-CE, and the UE may need an additional delay (SSB periodicity) to be able to synchronize with the SSBs. This is because the UE may be receiving the SSBs from different directions with different panels. However, when the UE is not capable of simultaneous reception with two panels, the UE needs to switch a panel to be able to synchronize with the SSBs. When the SSBs are overlapping or adjacent to each other, the UE would not have time to switch the panel fast enough to measure the SSBs on the first occasion.

SUMMARY

In a first aspect of the present disclosure, there is provided a first apparatus. The first apparatus comprises at least one processor; and at least one memory storing instructions that, when executed by the at least one processor, cause the first apparatus at least to: receive a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and determine an order for performing the first switch and the second switch.

In a second aspect of the present disclosure, there is provided a second apparatus. The second apparatus comprises at least one processor; and at least one memory storing instructions that, when executed by the at least one processor, cause the second apparatus at least to: cause a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent.

In a third aspect of the present disclosure, there is provided a method. The method comprises: receiving a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and determining an order for performing the first switch and the second switch.

In a fourth aspect of the present disclosure, there is provided a method. The method comprises: causing a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent.

In a fifth aspect of the present disclosure, there is provided a first apparatus. The first apparatus comprises means for receiving a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and means for determining an order for performing the first switch and the second switch.

In a sixth aspect of the present disclosure, there is provided a second apparatus. The second apparatus comprises means for causing a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments may now be described with reference to the accompanying drawings, where.

Throughout the drawings, the same or similar reference numerals represent the same or similar element.

DETAILED DESCRIPTION

Figure 1:
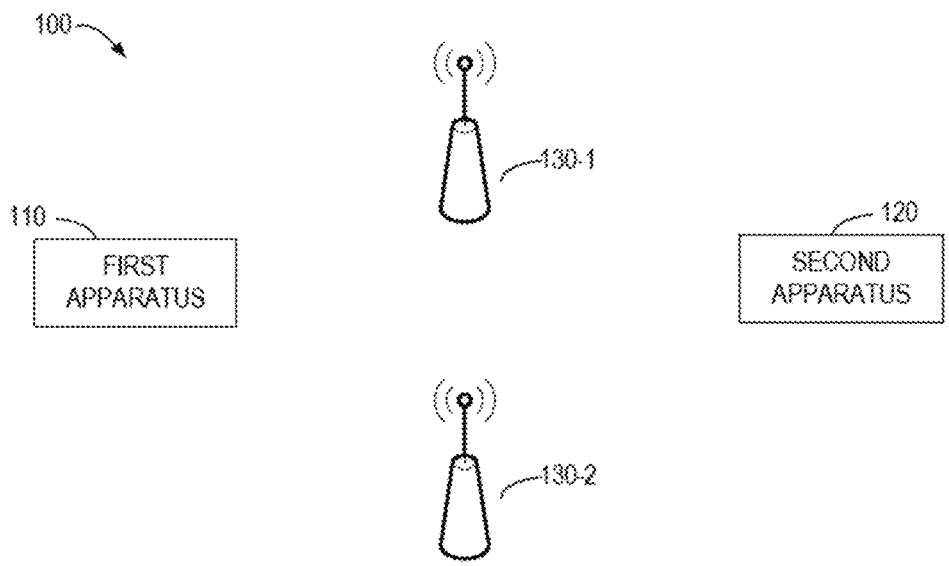
FIG. 1 illustrates an example communication environment in which example embodiments of the present disclosure can be implemented.

Principle of the present disclosure may now be described with reference to some example embodiments. It is to be understood that these embodiments are described only for the purpose of illustration and help those skilled in the art to understand and implement the present disclosure, without suggesting any limitation as to the scope of the disclosure. Embodiments described herein may be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It may be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It may be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there may of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Transmission Reception Point (TRP), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture includes a Centralized Unit (CU) and a Distributed Unit (DU) at an IAB donor node. An IAB node includes a Mobile Terminal (IAB-MT) part that behaves like a user equipment (UE) toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, UE, a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain may be used as an example of a transmission resource for describing some example embodiments of the present disclosure. It is noted that example embodiments of the present disclosure are equally applicable to other resources in other domains.

FIG. 1 illustrates an example communication environment 100 in which example embodiments of the present disclosure can be implemented. It is to be understood that the elements shown in the communication environment 100 are intended to represent main functions provided within the system. As such, the blocks shown in FIG. 1 reference specific elements in communication networks that provide these main functions. However, other network elements may be used to implement some or all of the main functions represented. Also, it is to be understood that not all functions of a communication network are depicted in FIG. 1. Rather, functions that facilitate an explanation of illustrative embodiments are represented. Further, the number of the elements shown in FIG. 1 is also for the purpose of illustrative only and there may be any number of elements.

In the communication environment 100, a plurality of communication devices, including a first apparatus 110, a second apparatus 120 and network devices 130-1 and 130-2 (collectively or individually referred to as network device 130) can communicate with each other.

The second apparatus 120 has a certain coverage range, which may be called as a cell. The first apparatus 110 is located in the cell managed by the second apparatus 120. In the communication environment 100, the second apparatus 120 may communicate data and control information with the first apparatus 110.

In some example embodiments, the first apparatus 110 may act as a terminal device (e.g., a UE), the second apparatus 120 may act as a network device (for example, a gNB) and the network devices 130-1 and 130-2 may act as further network devices (for example, TRPs). A link from the second apparatus 120 to the first apparatus 110 is referred to as a downlink (DL), while a link from the first apparatus 110 to the second apparatus 120 is referred to as an uplink (UL). In DL, the second apparatus 120 is a transmitting (TX) device (or a transmitter) and the first apparatus 110 is a receiving (RX) device (or a receiver). In UL, the first apparatus 110 is a TX device (or a transmitter) and the second apparatus 120 is a RX device (or a receiver). Similarly, a link from the network device 130 to the first apparatus 110 is also referred to as a downlink, while a link from the first apparatus 110 to the network device 130 is also referred to as an uplink.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

It is to be understood that the number of apparatuses and their connections shown in FIG. 1 are only for the purpose of illustration without suggesting any limitation. The communication environment 100 may include any suitable number of apparatuses configured to implement example embodiments of the present disclosure.

As discussed above, for 3rd Generation Partnership Project (3GPP) New Radio (NR) physical layer development for multi-transmission point (TRP), multi-TRP schemes have been studied and specified. Focused on Physical Downlink Shared Channel (PDSCH), two different frameworks are introduced. One framework is single-DCI used to support scenarios with ideal backhaul available among the TRPs, which for instance can make joint scheduling decisions. The other framework is multi-DCI used to support scenarios with non-ideal backhaul among the TRPs, where each TRP uses its own DCI to schedule downlink data transmission independently. In 3GPP Release 15 (Rel-15), transmission Configuration Indicator (TCI) states is only configured for downlink, while uplink spatial relation covers the beam indication for uplink.

Multi-TRP schemes for Physical Downlink Control Channel (PDCCH), Physical Uplink Shared Channel (PUSCH) and Physical Uplink Control Channel (PUCCH) are then focused on, although only time-division multiplexing (TDM) schemes have been defined for the uplink (UL). Then, the unified TCI state framework is specified in Rel-17, where TCI states are configured for both downlink and uplink. The configuration is either joint, where same TCI state covers both UL and DL, or separate, where separate TCI states are configured for DL and UL. Unified TCI state framework uses a common TCI state concept, where one common TCI/indicated TCI state at a time provides spatial assumption for the set of signals and channels (PDCCH, PDSCH, PUCCH, PUSCH, Channel State Information Reference Signal (CSI-RS), Sounding Reference Signal (SRS)). Assigning the unified TCI states is done with the following steps:
1. RRC-based configuration of up to 128 TCI states.
2. Media Access Control Control Element (MAC-CE)-based activation of TCI states into up to 8 codepoints in active TCI state list:
    a. If only one TCI state is activated to the active TCI state list, this also becomes the indicated TCI state.
3. DCI-based indication of a single joint TCI state or TCI state pair of DL and UL TCI states
    a. This step is only needed if there are more than one TCI state on the active TCI state list.

Then extending a unified TCI framework for indication of multiple DL and UL TCI states for multi-TRP is studied in Rel-18, where unified TCI states are used to provide Quasi Co Location (QCL) relationship to reference signals for the uplink and downlink of each TRP link, as stated in the following Table 1.

TABLE 1

2. Specify extension of Rel-17 Unified TCI framework for indication of multiple DL and UL TCI states focusing on multi-TRP use case, using Rel-17 unified TCI framework.

For MIMO evolution for downlink and uplink, unified TCI states are used in single-DCI and multi-DCI mode as described in the following.

Figure 2:
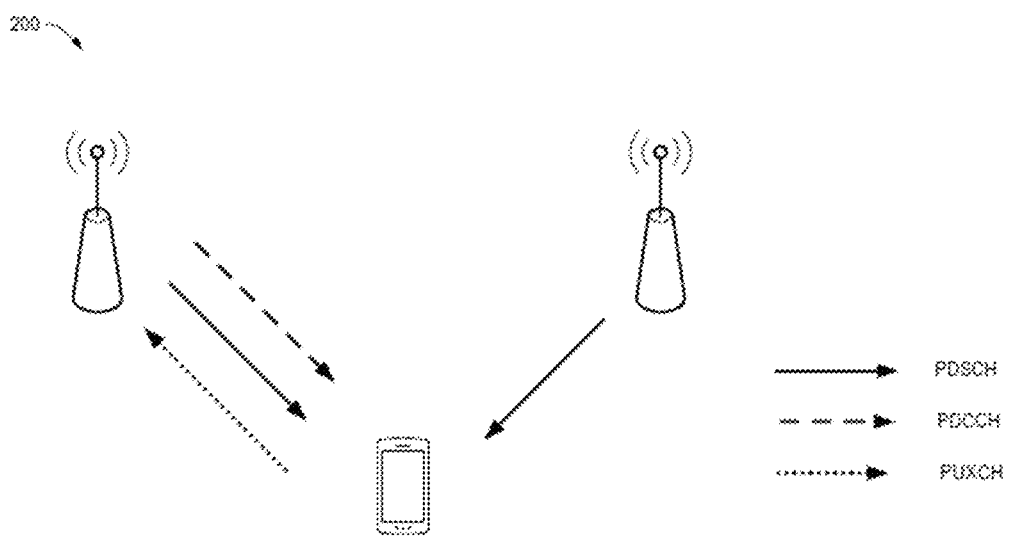
FIG. 2 illustrates a schematic diagram of a single-DCI mode.

Reference is made to FIG. 2, which illustrates a schematic diagram 200 of a single-DCI (sDCI) mode. In sDCI mode, PDSCH is scheduled from two TRPs by a single DCI on PDCCH, which is transmitted by only one of the two TRPs. Uplink transmission can be configured for each of the links.

In single-DCI mode, when unified TCI states are used, the UE is configured with a set of joint DL/UL TCI states and/or separate DL and UL TCI states. For MIMO evolution for downlink and uplink, a single MAC-CE command has been defined to activate either one or two joint DL/UL TCI states (or separate DL/UL TCI states) in max 8 codepoints to the UE's active TCI state list. A single DCI is used to indicate one of the codepoints including one or two TCI states with different QCL Type D sources to each TRP link. An example with joint DL/UL TCI states is shown in Table 2, which is an example of active TCI state list for sDCI.

TABLE 2

| Codepoint# | Joint DL/UL TCI state for TRP1 | Joint DL/UL TCI state for TRP2 |
| --- | --- | --- |
| 0 | TCI#0 | TCI#5 |
| 1 | TCI#0 | TCI#6 |
| 2 | TCI#1 | TCI#5 |
| 3 | TCI#2 | TCI#5 |
| 4 | TCI#3 | TCI#6 |
| 5 | TCI#3 | TCI#7 |
| 6 | TCI#0 | |
| 7 | TCI#1 | |

Figure 3:
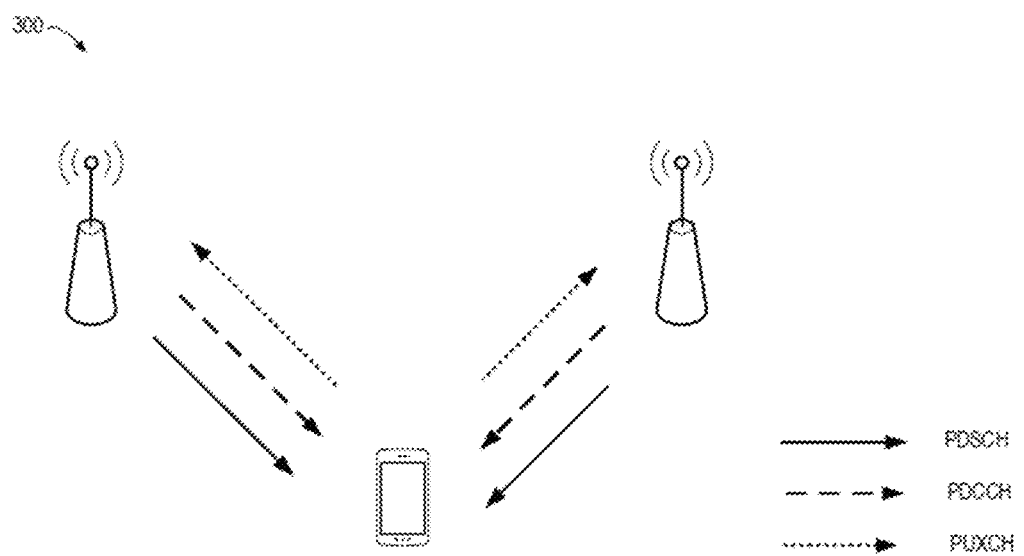
FIG. 3 illustrates a schematic diagram of a multi-DCI mode.

Reference is made to FIG. 3, which illustrates a schematic diagram 300 of a multi-DCI (mDCI) mode. In mDCI mode, PDSCH is scheduled with own DCIs on PDCCH that is transmitted by each TRP. Uplink transmission may be scheduled for both TRP links.

In the multi-DCI mode, when unified TCI states are used, similar to the single-DCI mode, the UE is configured with a set of joint DL/UL TCI states and/or separate DL and UL TCI states. Differently from the single-DCI mode, in the multi-DCI mode, separate MAC-CE commands are used for each TRP link to activate up to 8 joint DL/UL TCI states (or separate DL/UL TCI states) into max 8 codepoints to separate active TCI state lists for each TRP. Separate DCIs transmitted from each TRP are used to indicate one of the codepoints from each of the TRP specific active TCI state list. An example with joint DL/UL TCI states is shown in Table 3, which is example of active TCI state lists for multi-DCI.

TABLE 3

| Active TCI state list for TRP1 | | Active TCI state list for TRP2 | |
|---|---|---|---|
| Codepoint# | Joint DL/UL TCI state | Codepoint# | Joint DL/UL TCI state |
| 0 | TCI#0 | 0 | TCI#8 |
| 1 | TCI#1 | 1 | TCI#9 |
| 2 | TCI#2 | 2 | TCI#10 |
| 3 | TCI#3 | 3 | TCI#11 |
| 4 | TCI#4 | 4 | TCI#12 |
| 5 | TCI#5 | 5 | TCI#13 |
| 6 | TCI#6 | 6 | TCI#14 |
| 7 | TCI#7 | 7 | TCI#15 |

TCI state switching delay requirements for unified TCI states are defined for downlink and for uplink. The requirements define the delay within which the UE shall be able to complete MAC-CE based TCI state activation. The MAC-CE based TCI state activation is defined for DL and UL.

MAC-CE based TCI state activation is performed after receiving an MAC-CE command to activate one or more TCI states to the active TCI state list. During the MAC-CE activation delay, the UE will perform fine time/frequency tracking using the first Synchronization Signal and PBCH block (SSB) with the correct QCL relationship after the UE has processed the MAC-CE command.

When a target TCI state is known, for DL TCI state, the UE shall be able to receive using the target TCI state after a certain slot specified in the follow Table 4.

TABLE 4

If the target TCI state is known, upon receiving PDSCH carrying MAC-CE activation command in slot n, UE shall be able to receive
UE-dedicated PDCCH/PDSCH with target TCI state of the serving
cell on which TCI state switch occurs at the first slot that is after
slot n+ $T_{HARQ} + 3N_{slot}^{subframe,\mu} + TO_k*(T_{first-SSB} + T_{SSB-proc})$ /
NR slot
length. The UE shall be able to receive UE-dedicated PDCCH/
PDSCH with the old TCI state until slot n+ $T_{HARQ} + 3N_{slot}^{subframe,\mu}$
where $T_{HARQ}$ (in slot) is the timing between DL data transmission
and acknowledgement as specified in TS 38.213 [3];
- $T_{first-SSB}$ is time to first SSB transmission after the MAC CE
command is decoded by the UE; and the SSB shall be the QCL-
TypeA or QCL-TypeC to the target TCI state
- $T_{SSB-proc}$ = 2 ms;
- $TO_k$ = 1 if target TCI state is not in the active TCI state list
for
PDSCH/PDCCH, 0 otherwise.

When the target TCI state is unknown, an additional layer 1 Reference Signal Receiving Power (L1-RSRP) measurement period is added in the delay, as shown in the Table 5.

TABLE 5

If the target TCI state is unknown, upon receiving PDSCH
carrying MAC-CE activation command in slot n, UE shall be able
to receive UE-dedicated PDCCH/PDSCH with target TCI state of
the serving cell on which TCI state switch occurs at the first slot
that is after slot n+ $T_{HARQ} + 3N_{slot}^{subframe,\mu} + (T_{L1-RSRP} + TO_{uk}*$
$(T_{first-SSB} + T_{SSB-proc}))$ / NR slot length. The UE shall be able to
receive UE-dedicated PDCCH/PDSCH with the old TCI state
until slot n+ $T_{HARQ} + 3N_{slot}^{subframe,\mu}$.
Where
- $T_{L1-RSRP}$ = 0 in FR1 or when the TCI state switching not
  involving QCL-TypeD in FR2. Otherwise,
- $T_{L1-RSRP}$ is the time for Rx beam refinement in FR2, defined as
- $T_{L1-RSPR\_Measurement\_Period\_SSB}$ for SSB as specified in clause
  9.5.4.1,
  - with the assumption of M=1
  - with $T_{Report}$ = 0
- $T_{L1-RSRP\_Measurement\_Period\_CSI-RS}$ for CSI-RS as specified in clause
  9.5.4.2
- CSI-RS based L1-RSRP measurement only apply for TCI state
  switch when source RS is associated
with serving cell
  - configured with higher layer parameter repetition set to ON
  - with the assumption of M=1 for periodic CSI-RS
  - for aperiodic CSI-RS if number of resources in resource set at
    least equal to MaxNumberRxBeam
  - with $T_{Report}$ = 0
- $TO_{uk}$ = 1 for CSI-RS based L1-RSRP measurement, and 0 for
  SSB based L1-RSRP measurement
when TCI state switching involves QCL-TypeD
- $TO_{uk}$ = 1 when TCI state switching involves other QCL types
  only
- $T_{first-SSB}$ is time to first SSB transmission after L1-RSRP
  measurement when TCI state switching
involves QCL-TypeD;
- $T_{first-SSB}$ is time to first SSB transmission after MAC CE
  command is decoded by the UE for other
QCL types;
- The SSB shall be the QCL-TypeA or QCL-TypeC to target TCI
  state TCI state is known under the following conditions as shown in Table 6.

TABLE 6

8.15.2 Known conditions for downlink TCI state
The downlink TCI state is known if the following conditions are met:
- During the period from the last transmission of the RS resource
  used for the L1-RSRP measurement reporting for the target downlink
  TCI state to the completion of active downlink TCI state switch,
  where the RS resource for L1-RSRP measurement is the RS in target
  downlink TCI state or QCLed to the target downlink TCI state
  - Downlink TCI state switch command is received within 1280 ms
  upon the last transmission of the RS resource for beam reporting or
  measurement
  - The UE has sent at least 1 L1-RSRP report for the target
  downlink TCI state before the downlink TCI state switch command
  - The target downlink TCI state remains detectable during the down-
  link TCI state switching period
  - The SSB associated with the downlink TCI state remain detectable
during the downlink TCI switching period
    - SNR of the downlink TCI state ≥ −3dB
    - The SSB can be associated with either the serving cell PCI or a
    PCI different from serving cell PCI.
Otherwise, the downlink TCI state is unknown.

For MIMO evolution for downlink and uplink in Rel-18, TCI state switching requirements is defined for switching of two TCI states with different QCL Type D sources with a single MAC-CE command in single-DCI mode and with two separate MAC-CEs in multi-DCI mode.

It is agreed to define the requirements under the assumption that the UE is not capable of simultaneous downlink reception or uplink transmission. The latest agreements are captured and are described below in Table 7. It is noted that, the "cases" mentioned in the sDCI issues are as follows:

Case 1: If both target TCIs are known;

Case 2: If one of target TCIs is unknown and another is known;

Case 3: If both target TCIs are unknown.

TABLE 7

<Topic 3 Unified TCI Framework extended to M-TRP>

Issue 3-1-1: For sDCI mTRP, how to specify DL MAC CE based dual TCI state switch the switching delay requirements for Case 1, if SSB are adjacent in FR2?
Agreement:
The SSB periodicity is the same for serving cell
- $T_{HARQ} + 3N_{slot}^{subframe,\mu} + \max \{TO_{k1}*(T_{first-SSB1} + AD_1*TS_{SB1} + T_{SSB-proc}), TO_{k2}*(T_{first-SSB2} + AD_2*T_{SSB2} + T_{SSB-proc})\}$ / NR slot length
  - $AD_1 = 1$ if SSBs are adjacent in FR2 and $T_{SSB1} = T_{SSB2}$ ; 0 otherwise
  - $AD_2 = 1$ if SSBs are adjacent in FR2 and $T_{SSB2} = T_{SSB1}$ ; 0 otherwise Issue 3-1-2: For sDCI mTRP, how to specify DL MAC CE based dual TCI state switch the switching delay requirements for Case 2, if SSB are adjacent in FR2?
Agreement:
- $(T_{SSB1} = T_{SSB2}): T_{HARQ} + 3N_{slot}^{subframe,\mu} + T_{L1-RSRP1} + \max \{TO_{uk1}*(T_{first-SSB1} + AD_1*T_{SSB1} + T_{SSB-proc}), TO_{k2}*(T_{first-SSB2} + T_{SSB-proc})\}$ / NR slot length; $AD_1 = 1$ if SSBs are adjacent in FR2; 0 otherwise Issue 3-1-3: For sDCI mTRP, how to specify DL MAC CE based dual TCI state switch the switching delay requirements for Case 3, if SSB are adjacent in FR2?
Way forward:
- Option 1:
  - Longer delay is expected
- Option 2:
  - Additional SSB can be added in the MAC-CE based TCI state switching Issue 3-1-4: For sDCI mTRP, end point of dual TCI state switch delay requirements?
Agreement:
- Dual TCI state switch requirements for sDCI are defined for the case when UE is expected to receive PDCCH/PDSCH from both TCI states/ TRPs after the switch.

Issue 3-1-5 For sDCI mTRP, active TCI state list update delay
Agreement:
- For the case of overlapping/adjacent SSB in FR2, additional SSB can be added in active TCI state list update delay Issue 3-1-7-a For mDCI mTRP, how to specify DL TCI state switching requirements for eUTCI if UE not supporting two TAs?
Agreement:
- [Known]: $T_{HARQ} + 3N_{slot}^{subframe,\mu} + TO_k*(T_{first-SSB} + T_{SSB-proc} + OL*T_{SSB})$
- [Unknown]: $T_{HARQ} + 3N_{slot}^{subframe,\mu} + TL_{1-RSRP} + TO_{uk}*(T_{first-SSB} + T_{SSB-proc} + OL*T_{SSB})$
- OL=1 if SSB overlaps or adjacent to SSB from other TRP in FR2 and SSB periodicity is less than that of other TRP, 0 otherwise Issue 3-1-7-b For mDCI mTRP, how to specify UL TCI state switching requirements for eUTCI if UE not supporting two TAs?
Agreement:
- Rel-17 unified TCI state switching requirements are applicable for each TCI state associated with coresetPoolIndex independently Issue 3-1-8-a: For mDCI mTRP, how to specify DL TCI state switching requirements for eUTCI if UE supporting two TAs and but not supporting RTD>CP?
Agreement:
- [Known]: $T_{HARQ} + 3N_{slot}^{subframe,\mu} + TO_k*(T_{first-SSB} + T_{SSB-proc} + OL*T_{SSB})$
- [Unknown]: $T_{HARQ} + 3N_{slot}^{subframe,\mu} + TL_{1-RSRP} + TO_{uk}*(Tf_{irst-SSB} + T_{SSB-proc} + OL*T_{SSB})$
- OL=1 if SSB overlaps or adjacent to SSB from other TRP in FR2 and SSB periodicity is less than that of other TRP, 0 otherwise Issue 3-1-8-b: For mDCI mTRP, how to specify UL TCI state switching requirements for eUTCI if UE supporting two TAs and but not supporting RTD>CP?
Way forward:
- Option 1:
  - [Known case] $T_{HARQ} + 3N_{slot}^{subframe,\mu} + TO_{k-ref}(T_{first-SSB-DLRef} + 2ms) + NM*(T_{first-PL-RS} + 4*T_{target\_PL-RS} + 2ms)$
  - [Unknown case]: $T_{HARQ} + 3N_{slot}^{subframe,\mu} + T_{L1-RSRP} + TO_{uk-ref}(T_{first-SSB-DLRef} + 2ms) + T_{first-PL-RS} + 4*T_{target\_PL-RS} + 2ms$
- Option 2:
  - Rel-17 unified TCI state switching requirements are applicable for each TCI state associated with coresetPoolIndex independently
  - [Known case] $T_{HARQ} + 3N_{slot}^{subframe,\mu} + NM*(T_{first\_target-PL-RS} + 4*T_{target\_PL-RS} + 2ms)$
  - [Unknown case]: $T_{HARQ} + 3N_{slot}^{subframe,\mu} + T_{L1-RSRP} + T_{first\_target-PL-RS} + 4*T_{target\_PL-RS} + 2ms$ Issue 3-1-9-a: For mDCI mTRP, how to specify DL TCI state switching requirements for eUTCI if UE supporting two TAs and supporting RTD>CP in FR1?
Agreement:
- Rel-17 unified TCI state switching requirements are applicable for each TCI state associated with coresetPoolIndex independently Issue 3-1-9-b: For mDCI mTRP, how to specify UL TCI state switching requirements for eUTCI if UE supporting two TAs and supporting RTD>CP in FR1?
Way forward:
- Option 1:
  - [Known case] $T_{HARQ} + 3N_{slot}^{subframe,\mu} + TO_{k-ref}(T_{first-SSB-DLRef} + 2ms) + NM*(T_{first-PL-RS} + $ TABLE 7-continued <Topic 3 Unified TCI Framework extended to M-TRP>

$4*T_{target\_PL-RS} + 2ms)$
  ○ [Unknown case]: $T_{HARQ} + 3N_{slot}^{subframe,\mu} + T_{L1-RSRP} + TO_{uk-ref}(T_{first-SSB-DLRef} + 2ms) + T_{first-PL-RS} + 4*T_{target\_PL-RS} + 2ms$
• Option 2:
  ○ Rel-17 unified TCI state switching requirements are applicable for each TCI state associated with coresetPoolIndex independently
  ○ [Known case] $T_{HARQ} + 3N_{slot}^{subframe,\mu} + NM*(T_{first\_target-PL-RS} + 4*T_{target\_PL-RS} + 2ms)$
  ○ [Unknown case]: $T_{HARQ} + 3N_{slot}^{subframe,\mu} + T_{L1-RSRP} + T_{first\_target-PL-RS} + 4*T_{target\_PL-RS} + 2ms$
Issue 3-1-10 For mDCI mTRP, active TCI state list update delay
Agreement:
• For the case of overlapping/adjacent SSB in FR2, additional SSB can be added in active TCI state list update delay
Issue 3-1-11: L1-RSRP measurement when RTD>CP
Agreement:
• Define requirements for FR1 for intra/inter-cell.
• For FR1, if UE supports RTD>CP, reuse Rel-17 L1-RSRP measurement period in 9.13 for a cell with different PCI from serving cell, remove the RTD is smaller than CP side condition. Reuse L1-RSRP measurement period in 9.5 for serving cell.
• If UE does not support RTD>CP, for RTD is larger than CP, no requirements.
• FFS on scheduling/measurement restriction for different SCS and TDD.
Issue 3-1-12: L1-RSRP measurement for resource type of mTRP for a cell with different PCI from serving cell
Agreement:
SSB only, no CSI-RS In legacy solutions, such as the TCI state switching delay requirements and the relevant agreements in 3GPP MIMO evolution as described above, it has agreed that in sDCI (Issue 3-1-1) when the SSBs which are used for fine time/frequency (T/F) tracking for the two activated downlink TCI states are overlapping (completely or partially in time domain), or adjacent (that is, when the distance between the end of the first SSB1 and the beginning of the first SSB2 is less than X ms/symbols, e.g. X=1 symbol), the UE is able to do the T/F tracking for each of the first SSBs after processing the MAC-CE, but the UE would need an additional delay (SSB periodicity) to synchronize with both SSBs. This is because the UE may be receiving the two first SSBs from different directions with different panels, and when the UE is not capable of simultaneous reception with two panels, the UE would need to switch the panel to synchronize with both SSBs. When the SSBs are overlapping or adjacent to each other, the UE would not have time to switch the panel so fast that it would be able to measure both SSBs on the first occasion (overlapping or adjacent).

Figure 4:
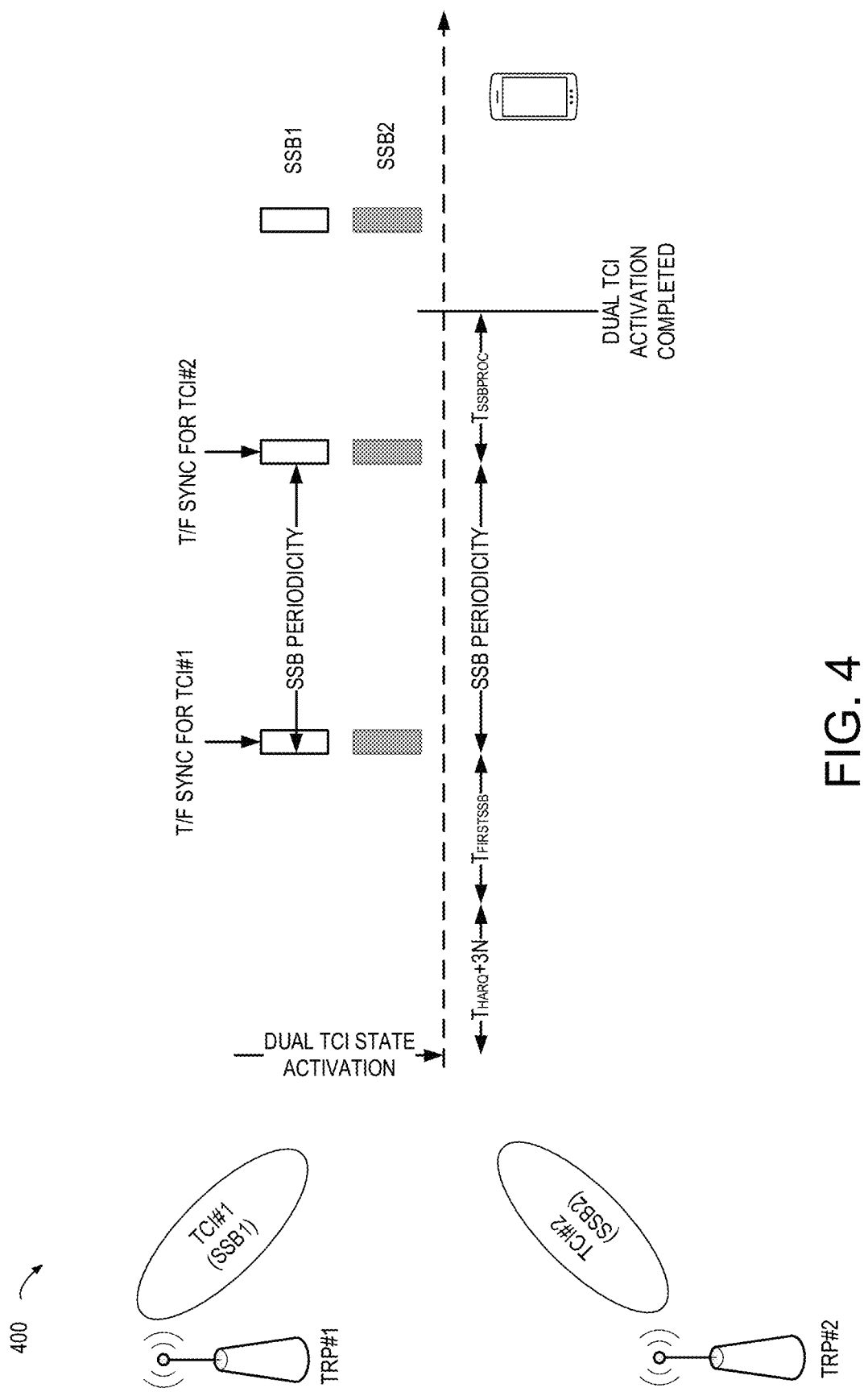
FIG. 4 illustrates a schematic diagram of TCI state switching delay in single-DCI mode.

This is illustrated in FIG. 4, which shows a schematic diagram 400 of TCI state switching delay in single-DCI mode. The UE is switching to TCI state #1 and #2. The UE synchronizes first with SSB1 with QCL relationship to TCI state #1 but is not able to measure SSB2 which is overlapping with SSB1 in the first occasion. Therefore, the UE has to wait for a whole SSB periodicity to synchronize with SSB2 which has a QCL relationship to TCI state #2.

Figure 5:
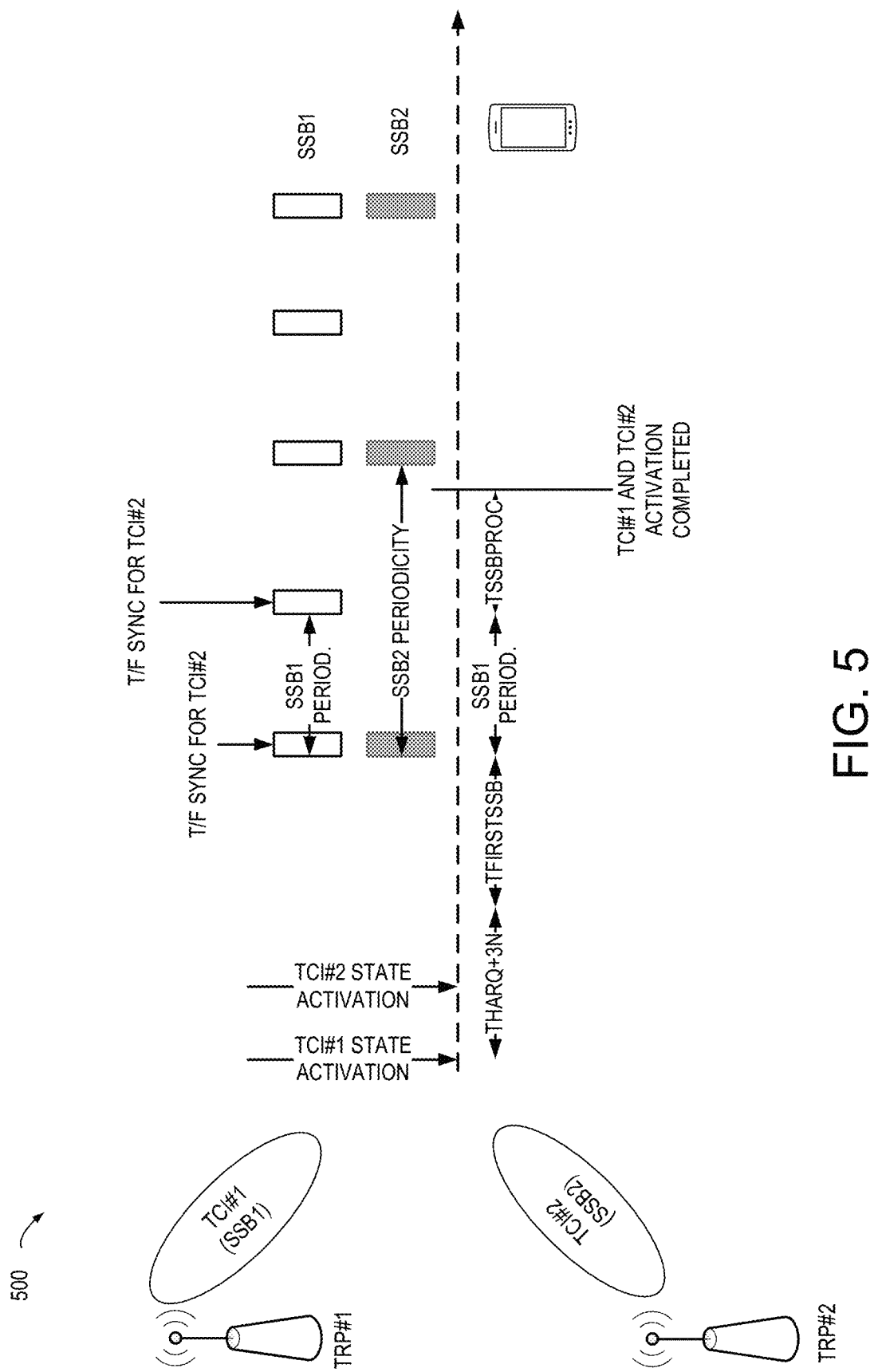
FIG. 5 illustrates a schematic diagram of TCI state switching delay in multi-DCI mode.

Similarly for mDCI, although the two TCI states (associated to the two TRPs) are activated separately, i.e. with two different MAC-CEs, it can still happen that they are activated separately from the two TRPs at very close by time, and a baseline UE (Issues 3-1-7-a and 3-1-8-a) is as well not able to do the T/F tracking for each of the first SSBs after processing the MAC-Ces when the SSBs are overlapping or adjacent. Furthermore, differently from sDCI, in mDCI SSB periodicity can be different between SSB1 and SSB2 (as intra-cell has been in the focus of sDCI) and, for that purpose, it is agreed that the additional SSB periodicity delay for a TRP is added if such SSB periodicity is less than that of other TRP. This aspect makes sure that, for example as shown in FIG. 5 (which shows a schematic diagram 500 of TCI state switching delay in multi-DCI mode), if SSB1 periodicity is smaller than SSB2 periodicity, the UE first does the T/F tracking for SSB2, waits one SSB1 periodicity, and then does the T/F tracking for SSB1, such that the whole TCI switching delay is minimized. In our understanding, in case SSB1 and SSB2 periodicities are the same, the "less than that" above can be read as "not greater than that", meaning that the UE can decide autonomously for which SSB to do the T/F tracking first.

With such framework, for both sDCI and mDCI scenarios, in case of same SSB periodicity, one SSB periodicity is added as a requirement for both TCI states. On the other hand, as we explained above, in practice, one TCI switch will be completed first, and the other later after that SSB periodicity, but which will be completed first is not known at the network, and, in current specifications, left up to the UE implementation.

Such solution is sub-optimal because we may have benefits at the network side in knowing such information, i.e., in knowing which TCI state will be switched first.

An initial solution in which a rule that the UE has to follow has been proposed, e.g., in the form of an "anchor link" that defines which TCI state the UE must switch first. In a solution, some options are defined, for example using the coresetPoolIndex to indicate a specific "anchor link". However, there are two limitations in the solution. One limitation is that the options defined there are not based on any performance metric, i.e., they do not depend on e.g. network load or channel conditions, and somehow setting which TCI state is switched first is not optimized in any way. The other limitation is that the options are "static" mechanisms, that is, there is no dynamic method that network and UE can for instance use to re-define the "anchor link" based on e.g. network load or channel conditions.

A solution tries to overcome the first limitation just mentioned, introducing for instance a rule to decide which TCI state to switch first based e.g. on a set of last RSRP measurement reports. However, more thorough solutions can be proposed, i.e. including dedicate signaling. For example, assuming that the UE still decides which TCI state is switched first but the networks knows about that via for instance some UE signaling, the network could use such information to avoid, for instance in sDCI, doing this dual switching in certain conditions, such as, if the network knows that UE will switch first TRP1 and then TRP2, but link UE-TRP2 is getting worse faster than the link UE-TRP1 (and the network knows about that thanks to, e.g., L1-RSRP reporting from the UE), the network would prefer to have TRP2 to be switched faster than TRP1. In such case, the network could first switch the TCI for TRP2 and, when such switching is completed, switch the TCI for TRP1.

According to some example embodiments of the present disclosure, a solution for TCI activation in mTRP is proposed. In the solution, a UE receives a first indication indicating a first switch from a first source TCI state to a first target TCI state and a second indication indicating a second switch from a second source TCI state to a second target TCI state. Then, the UE determines an order for performing the first switch and the second switch.

Two main alternative solutions are possible. One is that the network decides which SSB should be used first for T/F tracking by the UE, and therefore the network informs the UE about that via RRC signaling statically or via DCI or MAC-CE signaling dynamically. The other one is that it is up to UE implementation to decide which SSB is used first for T/F tracking, thus to determine which TCI state can be activated/switched first. Then, the UE informs the network about that via RRC signaling statically or via UCI or MAC-CE signaling dynamically.

In this way, dynamic mechanisms are introduced, such that UE and network know which TCI state will be activated/switched in case overlapping/adjacent SSBs for both sDCI and mDCI mTRP. It is noted that both the two alternative solutions offer the additional flexibility to adapt dynamically depending on the scenario. The first alternative solution allows the network to have more control, and the second alternative solution leaves more freedom at the UE side.

Signaling alternatives used to implement the alternative solutions are described. When using MAC-CE signaling in the first alternative solution and the second alternative solution, the network device or the UE indicates which one is the TCI state that needs to be switched first. On the other hand, since RRC signaling is slower than MAC CE signaling, the indication of which TCI state to be switched first might not be so easy, since there are many combinations of source/target TCI states that would need to be considered. Therefore, for RRC signaling approach, there may be different options either for the network device to inform the UE (in the first alternative solution) or for the UE to inform the network device (in the second alternative solution) to actually signal a specific TCI to be activated/switched first. The different options may be, for example but not limited to:
  i. The TCI state associated with a lower or higher or a specific coresetPoolIndex.
  ii. The TCI state associated with a lower or higher or a specific TAG ID.
  iii. The TCI state associated with the TRP for which uplink is configured, if uplink is configured for only one of the two TRPs.
  iv. In case of sDCI, the TCI state carrying the PDCCH.
  v. In case of sDCI, the TCI state carrying only PDSCH.
  vi. The TCI state for which a worse link quality has been measured by the UE, and that can be based on a set of last measurement reports (L1 or L3), for example considering metrics like Reference Signal Received Power (RSRP), Reference Signal Received Quality (RSRQ), Reference Signal Strength Indicator (RSSI), Signal to Interference plus Noise Ratio (SINR), or Signal to Noise Ratio (SNR).
  vii. The TCI state associated to the TRP for which a lower PHR is reported.

Note that options vi.-vii. above have the advantage to allow activating/switching the TCI states in an "optimized order", for example based on UE RSRP reporting such that the TCI state whose link quality is degrading faster is activated first. On the other hand, although there is no actual optimization with options i.-v., they fulfill the purpose of letting UE and network know which TCI will be activated/switched first, and their advantage is simplicity.

In the following, some signaling charts are provided to describe how the idea works for a scenario where a UE is configured with DL mTRP and needs to switch from TCI #1 to TCI #3 for TRP1 and from TCI #2 to TCI #4 for TRP2. Both mDCI and sDCI cases are covered, for sDCI case the DCI is assumed to be sent by TRP1.

Example embodiments of the present disclosure will be described in detail below with reference to the accompanying drawings.

Figure 6:
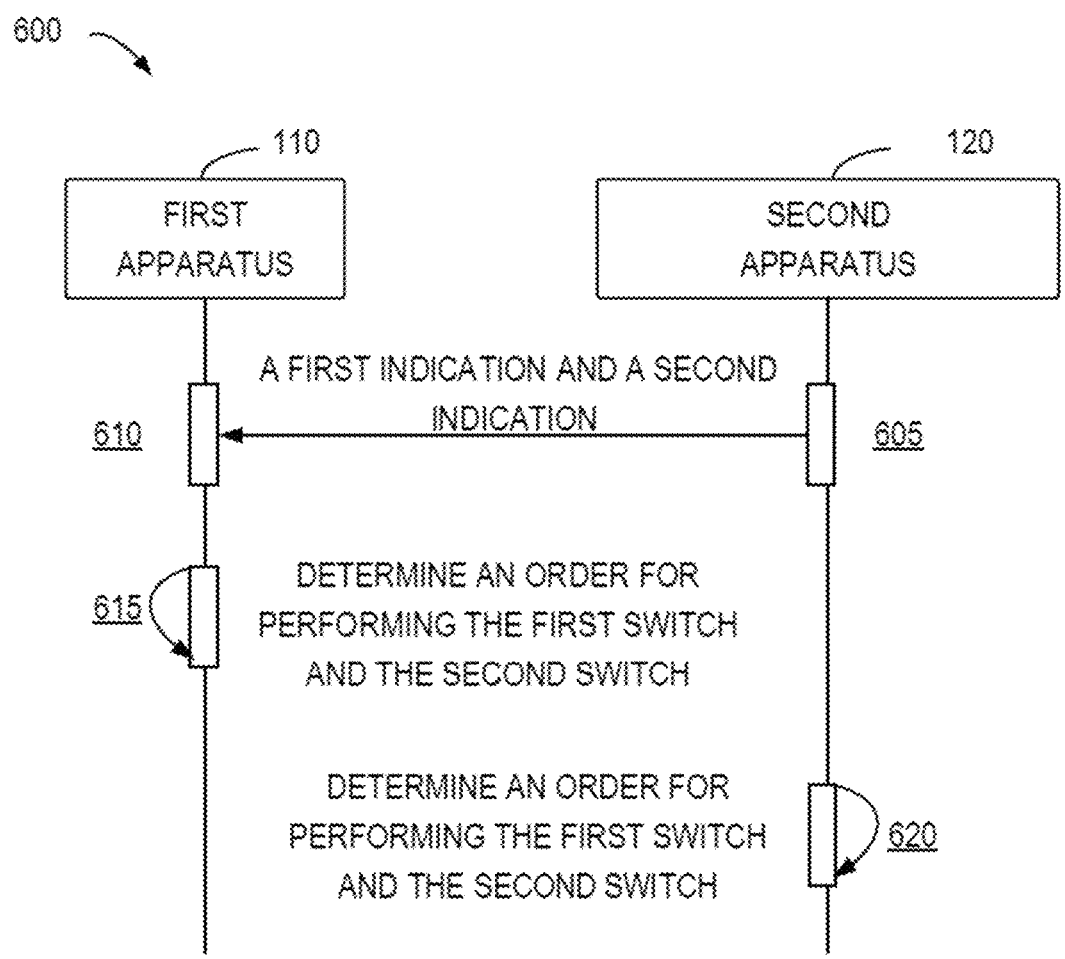
FIG. 6 illustrates a signaling flow for TCI activation in multi-transmission and receiving point (mTRP) according to some example embodiments of the present disclosure.

FIG. 6 illustrates a signaling flow 600 for TCI activation in mTRP according to some example embodiments of the present disclosure. For the purposes of discussion, the signaling flow 600 will be discussed with reference to FIG. 1. The signaling flow involves a first apparatus 110 and a second apparatus 120. For the purpose of illustration, some example embodiments may be described with the first apparatus 110 operating as a terminal device (for example, a UE) and the second apparatus 120 operating as a network device (for example, a gNB or a TRP).

The second apparatus 120 causes a first indication and a second indication to be transmitted (605) to a first apparatus 110. The first apparatus 110 receives (610) the first indication and the second indication. The first indication indicates a first switch from a first source transmission configuration indicator (TCI) state to a first target TCI state is to be performed and the second indication indicates a second switch from a second source TCI state to a second target TCI state is to be performed. The first source TCI state has been activated for a first network device, and the second source TCI state has been activated for a second network device. The first network device and the second network device may be examples of the network devices 130-1 and 130-2 in FIG. 1. That is, the first network device and the second network device may be TRPs, respectively. In such case, reference signals associated with the first target TCI state and the second target TCI state are adjacent. In some example embodiment, the reference signals may include SSBs, for example.

It is to be understood that, the first network device and the second first network device discussed here may be the same TRP, that is, there is only one single TRP, or may be different TRPs, that is, there are multiple TRPs. Although some example embodiments of the present disclosure take the multiple TRP scenario as an example, it is just for purpose of illustration, rather suggesting any limitations. Note that the single TRP is also applicable for example embodiments of the present disclosure.

The first indication and the second indication may be transmitted from the first network device and the second network device, respectively. Alternatively, the first indication and the second indication may be both transmitted from the first network device, or both transmitted from the second network device. As a further alternative, the first indication and the second indication may be transmitted from the second apparatus 120. In some example embodiments, the second apparatus 120 may cause the first indication and the second indication to be transmitted from one of or both of the first network device and the second network device, or transmit the first indication and/or the second indication by itself.

The first apparatus 110 determines (615) an order for performing the first switch and the second switch. In some solutions, the determination (615) of the order may be determined based on a configuration from the network (NW). Specifically, the first apparatus 110 may receive, from a second apparatus, a configuration of the order and may determine the order based on the configuration, which will be described in detail in FIGS. 7-8. For these example embodiments, the configuration may be included in a RRC message, or one or more MAC CE commands. That is, the first apparatus 110 may be configured via RRC configuration or MAC CE configuration by the second apparatus 120.

In some example embodiments, the first apparatus 110 may receive the configuration in a MAC CE command from one of the first network device and the second network device. Specifically, such MAC CE command may be a single command sent by only one TRP.

Alternatively, the first apparatus 110 may receive the configuration in a MAC CE command from one of the first network device and the second network device, and the MAC CE command may further include a TCI state switch command. Alternatively, such MAC CE command may be sent by only one TRP as part of the TCI state switch command.

In other example embodiments, the first apparatus 110 may receive the configuration in a first MAC CE command from the first network device and a second MAC CE command from the second network device, with the first MAC CE command and the second MAC CE command having different priorities. Each TRP may send one MAC-CE command, for example with a priority (at least with two levels "high" or "low") for its TCI state switch.

The configuration may indicate the order for performing switches is based on, for example, a control resource set (CORESET) pool index, a timing advance group identification (TAG ID), whether a network device for which uplink is configured is associated with, a link quality, which network device carries downlink control information (PDCCH, for example), a predicted link quality, a reported power headroom, and so on. The first apparatus 110 may determine the order based on information indicated by the configuration.

In some example embodiments, the determination of the order may be based on a control resource set (CORESET) pool index, for example, denoted as coresetPoolIndex. The order may indicate the first switch is to be performed before the second switch in a case that the first source TCI state has a higher CORESET pool index than the second source TCI state, or the first target TCI state has a higher CORESET pool index than the second target TCI state. Alternatively, the order may indicate the first switch is to be performed before the second switch in a case that the first source TCI state has a lower CORESET pool index than the second source TCI state, or the first target TCI state has a lower CORESET pool index than the second target TCI state. The TCI state associated with lower or higher or a specific coresetPoolIndex may be switched first.

In alternative example embodiments, the determination of the order may be based on a timing advance group identification (TAG ID). The order may indicate the first switch is to be performed before the second switch in a case that the first source TCI state has a higher TAG ID than the second source TCI state, or the first target TCI state has a higher TAG ID than the second target TCI state. Alternatively, the order may indicate the first switch is to be performed before the second switch in a case that the first source TCI state has a lower TAG ID than the second source TCI state, or the first target TCI state has a lower TAG ID than the second target TCI state. The TCI state associated with lower or higher or a specific TAG ID may be switched first.

Some examples of the order determined from the configuration are provided below. In other example embodiments, the order may indicate the first switch is to be performed before the second switch in a case that the first source TCI state or the first target TCI state is associated with a network device for which uplink is configured. The TCI state associated with the TRP for which uplink is configured may be switched first, if uplink is configured for only one of the two TRPs.

In addition, the order may indicate the first switch is to be performed before the second switch in a case that the first source TCI state or the first target TCI state is activated for the first network device which carries downlink control information. In the sDCI mode, the TCI state carrying the PDCCH may be switched first. In the sDCI mode, the TCI state carrying only PDSCH may be switched first.

Furthermore, the order may indicate the first switch is to be performed before the second switch in a case that the first source TCI state for which a worse link quality has been measured than the second source TCI state, or the first target TCI state for which a worse link quality has been measured than the second target TCI state. Alternatively, the order may indicate the first switch is to be performed before the second switch in a case that the first source TCI state for which a better link quality has been measured than the second source TCI state, or the first target TCI state for which a better link quality has been measured than the second target TCI state. That is, a TCI state for which a worse link quality has been measured by the first apparatus 110 may be switched first. The link quality may be based on a set of last measurement reports (Layer 1 or Layer 3), for example considering metrics like RSRP, RSRQ, RSSI, SINR and so on.

Moreover, the order may indicate the first switch is to be performed before the second switch in a case that the first source TCI state for which a worse predicted link quality has been measured than the second source TCI state, or the first target TCI state for which a worse predicted link quality has been measured than the second target TCI state. Alternatively, the order may indicate the first switch is to be performed before the second switch in a case that the first source TCI state for which a better predicted link quality has been measured than the second source TCI state, or the first target TCI state for which a better predicted link quality has been measured than the second target TCI state. That is, the TCI state whose link quality is degrading faster or slower may be switched first.

In addition, the order may indicate the first switch is to be performed before the second switch in a case that the first source TCI state is associated with a network device for which a lower power headroom is reported than the second source TCI state, or the first target TCI state is associated with a network device for which a lower power headroom is reported than the second target TCI state. Alternatively, the order may indicate the first switch is to be performed before the second switch in a case that the first source TCI state is associated with a network device for which a higher power headroom is reported than the second source TCI state, or the first target TCI state is associated with a network device for which a higher power headroom is reported than the second target TCI state. That is, a TCI state associated to the TRP for which a lower PHR is reported may be switched first.

The second apparatus 120 may cause an updated configuration of the order to be transmitted to the first apparatus 110. The second apparatus 120 may cause the updated configuration to be transmitted in a single MAC CE command from one of the first network device and the second network device. The first apparatus 110 may receive the updated configuration of the order in a MAC CE command from one of the first network device and the second network device.

Alternatively, the second apparatus 120 may cause the updated configuration to be transmitted in a two separate MAC CE commands from both the first network device and the second network device. The first apparatus 110 may receive the updated configuration of the order in a third MAC CE command from the first network device and a fourth MAC CE command from the second network device, with the third MAC CE command and the fourth MAC CE command having different priorities. In this case, a MAC-CE command indicating which TCI state should be activated/switched first may be reconfigured to the first apparatus 110 dynamically, without an actual switch indication sent just before or after.

According to the above example embodiments, the first apparatus 110 may be configured via a RRC configuration or a MAC CE configuration by the second apparatus 120. However, the first apparatus 110 may determine the order without the RRC configuration or MAC CE configuration by the second apparatus 120 and the first apparatus 110 may informs the second apparatus 120 via RRC or MAC-CE about which TCI state will be activated/switched first. More details will be described with reference to FIGS. 9-10.

In contrast to the above solutions for determining the order based on the configuration from the NW, in some example embodiments, the first apparatus 110 may determine the order by itself. In particular, the first apparatus 110 may determine the order based on at least one of first information about a first transmission between the first network device and the first apparatus or second information about a second transmission between the second network device and the first apparatus. Specifically, it is up to the first apparatus 110 (for example, a UE) implementation to decide which TCI state should be activated/switched first. If the main objective for the UE to consider would be the link reliability, the UE may switch the TCI associated with the TRP where the link reliability is degrading faster first.

In some example embodiments, the first information may include, for example but not limited to, a link quality, a power headroom, a CORESET pool index, TAG ID and/or information on whether the first network device carries DCI, which are associated with the first transmission.

In addition, the second information may include, for example but not limited to a link quality, a power headroom, a CORESET pool index, TAG ID and/or information on whether the first network device carries DCI, which are associated with the second transmission.

Based on the first information and/or the second information, the first apparatus 110 may determine the order and thus knows which of the first switch and second switch is to be performed first.

After the determination, the first apparatus 110 may transmit information of the order to at least one of the first network device, the second network device, or a second apparatus. For example, the first apparatus 110 may inform the second device 120 about information of the order, i.e., about which TCI will be activated/switched first, e.g., via MAC-CE. Thus, the second apparatus 120 may receive the information of the order. In some example embodiments, the order may be included in a RRC message or in a MAC CE command.

In some example embodiment, the first apparatus 110 may determine an updated order based on at least one of updated information about the first transmission between the first network device and the first apparatus or updated information about the second transmission between the second network device and the first apparatus. Then, the first apparatus 110 may transmit the updated order in a MAC CE command to at least one of the first network device, the second network device, or the second apparatus 120. The second apparatus 120 may receive the updated order. That is, the first apparatus 110 may send to the second apparatus 120 a MAC-CE preference indicating which TCI state will be activated/switched first, even without an actual switch indication sent just before.

In some example embodiment, no matter whether the first apparatus 110 is configured by the second apparatus 120 or the first apparatus 110 inform the second apparatus 120 about which TCI state will be activated/switched first, the first apparatus 110 may receive the first indication and the second indication in a single MAC CE command from one of the first network device and the second network device. This is directed to the sDCI mode. Alternatively, the first apparatus 110 may receive the first indication in a MAC CE command from the first network device and the second indication in a further MAC CE command form the second network device. This is directed to the mDCI mode.

According to the order, the first apparatus 110 may perform a first synchronization for completing the first switch and a second synchronization for completing the second switch.

In some example embodiment, if the order indicates the first switch is to be performed before the second switch, after performing the first synchronization and before performing the second synchronization, the first apparatus 110 may receive a transmission from the first network device with the first target TCI state and a transmission from the second network device with the second source TCI state. After performing the first synchronization and the second synchronization, the first apparatus 110 may receive a transmission from the first network device with the first target TCI state and a transmission from the second network device with the second target TCI state.

In some example embodiment, the first apparatus may be a terminal device, for example, a UE. The second apparatus may be a network device, for example, a gNB or sometimes called as NW.

In the following descriptions, some signaling flows are provided to describe how the solutions work for a scenario where the first apparatus 110, that is, a terminal device (e.g., a UE) is configured with DL mTRP and needs to perform a first switch from a first source TCI state (TCI #1) to a first target TCI state (TCI #3) for a first network device (e.g., referred to as first TRP) and a second switch from a second source TCI state (TCI #2) to a second target TCI state (TCI #4) for a second network device (e.g., referred to as second TRP). Both mDCI and sDCI modes are considered. For the sDCI mode, the DCI is assumed to be sent by the first TRP.

Figure 7:
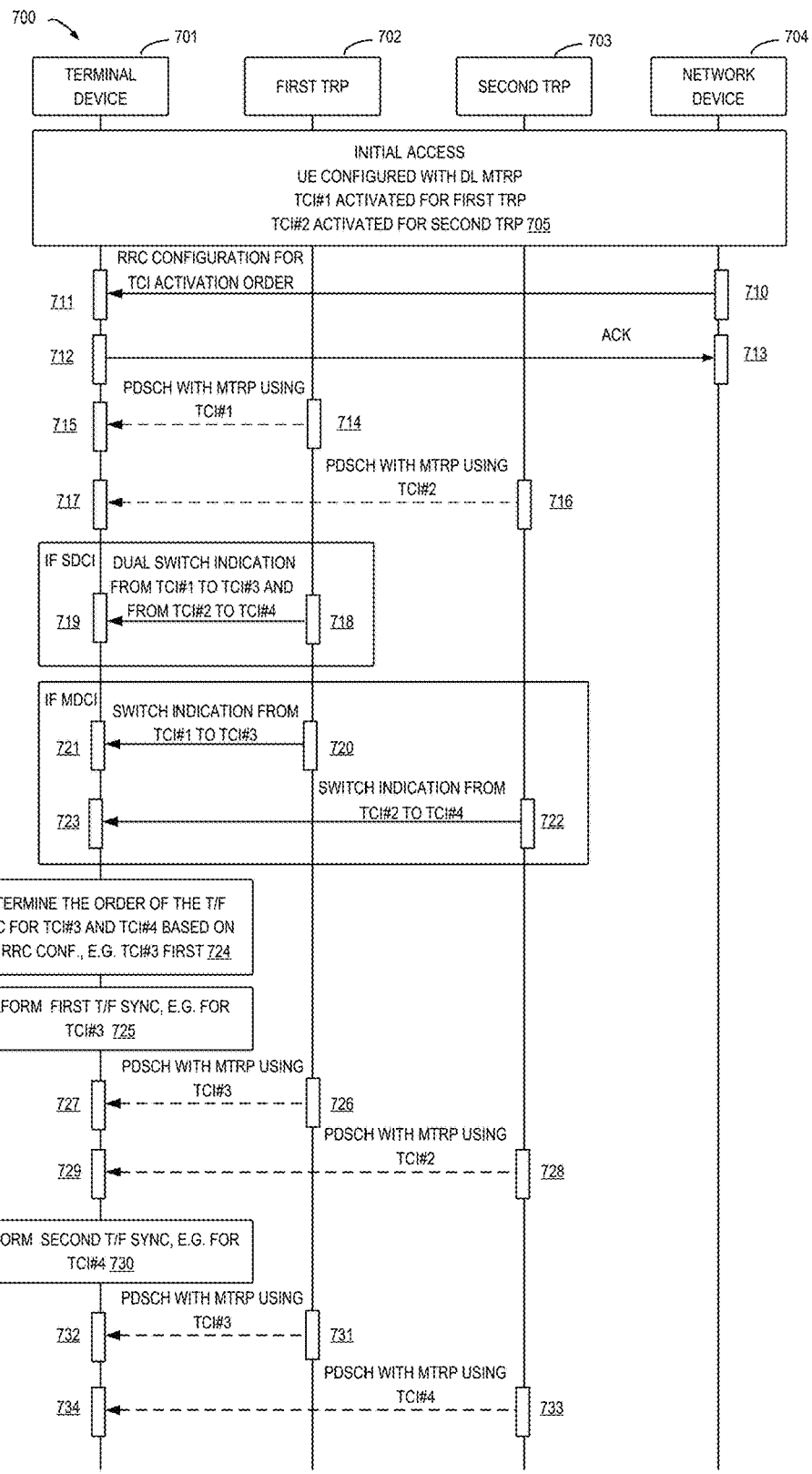
FIG. 7 illustrates a signaling flow for a configuration of a TCI activation ordering according to some example embodiments of the present disclosure.

FIG. 7 illustrates a signaling flow 700 for a configuration of a TCI activation ordering according to some example embodiments of the present disclosure. The signaling flow involves a terminal device 701, a first TRP 702, a second TRP 703 and a network device 704. The terminal device 701 may be an example of the first apparatus 110 as described in FIG. 1. The first TRP 702 and the second TRP 703 may be examples of the network device 130 in FIG. 1. The network device 704 may be an example of the second apparatus 120 as described in FIG. 1. TCI #1 may be an example of the first source TCI state as described above. TCI #3 may be an example of the first target TCI state as described above. TCI #2 may be an example of the second source TCI state as described above. TCI #4 may be an example of the second target TCI state as described above.

As shown in FIG. 7, the terminal device 701 is configured via a RRC configuration by the network device 704. At 705, an initial access is completed and the terminal device 701 is configured with DL mTRP. A TCI #1 is activated for the first TRP 702 and a TCI #2 activated for the second TRP 703. After the initial access and the configuration for the terminal device 701, the network device 704 transmit (710) a RRC configuration for TCI activation order to the terminal device 701. The RRC configuration is included in a RRC message. The RRC configuration indicates e.g. which TCI of the target TCI states should be activated/switched first. For example, the network device 704 may indicate the terminal device 701 to switch the TCI state associated to a specific coresetPoolIndex (as described in the above option i), although the other options are also possible.

The terminal device 701 receives (711) the RRC configuration for TCI activation order and transmit (712) an acknowledgement (ACK) to the network device 704. Then, the network device 704 receives (713) the ACK. The first TRP 702 transmits (714) PDSCH with mTRP using the TCI #1 and the terminal device 701 receives (715) the PDSCH from the first TRP 702. The second TRP 703 transmits (716) PDSCH with mTRP using the TCI #2 and the terminal device 701 receives (717) the PDSCH from the second TRP 703.

In the sDCI mode, the first TRP 702 transmits (718) a dual switch indication from the TCI #1 to the TCI #3 and from the TCI #2 to the TCI #4. The dual switch indication is transmitted via a MAC-CE command. The terminal device 701 receives (719) the dual switch indication. In the mDCI mode, the first TRP 702 transmits (720) a switch indication from the TCI #1 to the TCI #3 and the terminal device 701 receives (721) the switch indication. The second TRP 703 transmits (722) a switch indication from the TCI #2 to the TCI #4 and the terminal device 701 receives (723) the switch indication. Both the switch indications are transmitted via MAC-CE commands.

After receiving the MAC-CE command to switch both the TCI states (in the form of a single MAC-CE for the sDCI mode or in the form of separate MAC-CEs for the mDCI mode), the terminal device 701 determines (724) the order of T/F synchronization for the TCI #3 and the TCI #4 based on the RRC configuration. For example, the terminal device 701 may determine to activate the TCI #3 first. That is, the terminal device 701 determines (724) which one of the target TCI states is to be switched/activated first. For example, in the above-described option i for a specific coresetPoolIndex, the terminal device 701 may determines to switch the TCI associated to the specific coresetPoolIndex first.

The terminal device 701 performs (725) the first T/F synchronization, for example, for the TCI #3 and completes the switch from the TCI #1 to the TCI #3, such that the first TRP 702 transmits (726) PDSCH with the TCI #3 and the terminal device 701 receives (727) the PDSCH with the updated TCI state. At this point, the second TRP 703 continues to transmit (728) PDSCH with mTRP using the TCI #2 and the terminal device 701 continues to receive (729) the PDSCH from the second TRP 703.

The terminal device 701 then performs (730) the second T/F synchronization for example, for the TCI #4 and completes the switch from the TCI #2 to the TCI #4, such that the first TRP 702 transmits (731) PDSCH with the TCI #3 and the terminal device 701 receives (732) the PDSCH with the updated TCI state and the second TRP 703 transmits (733) PDSCH with the TCI #4 and the terminal device 701 receives (734) the PDSCH with the updated TCI states.

Figure 8:
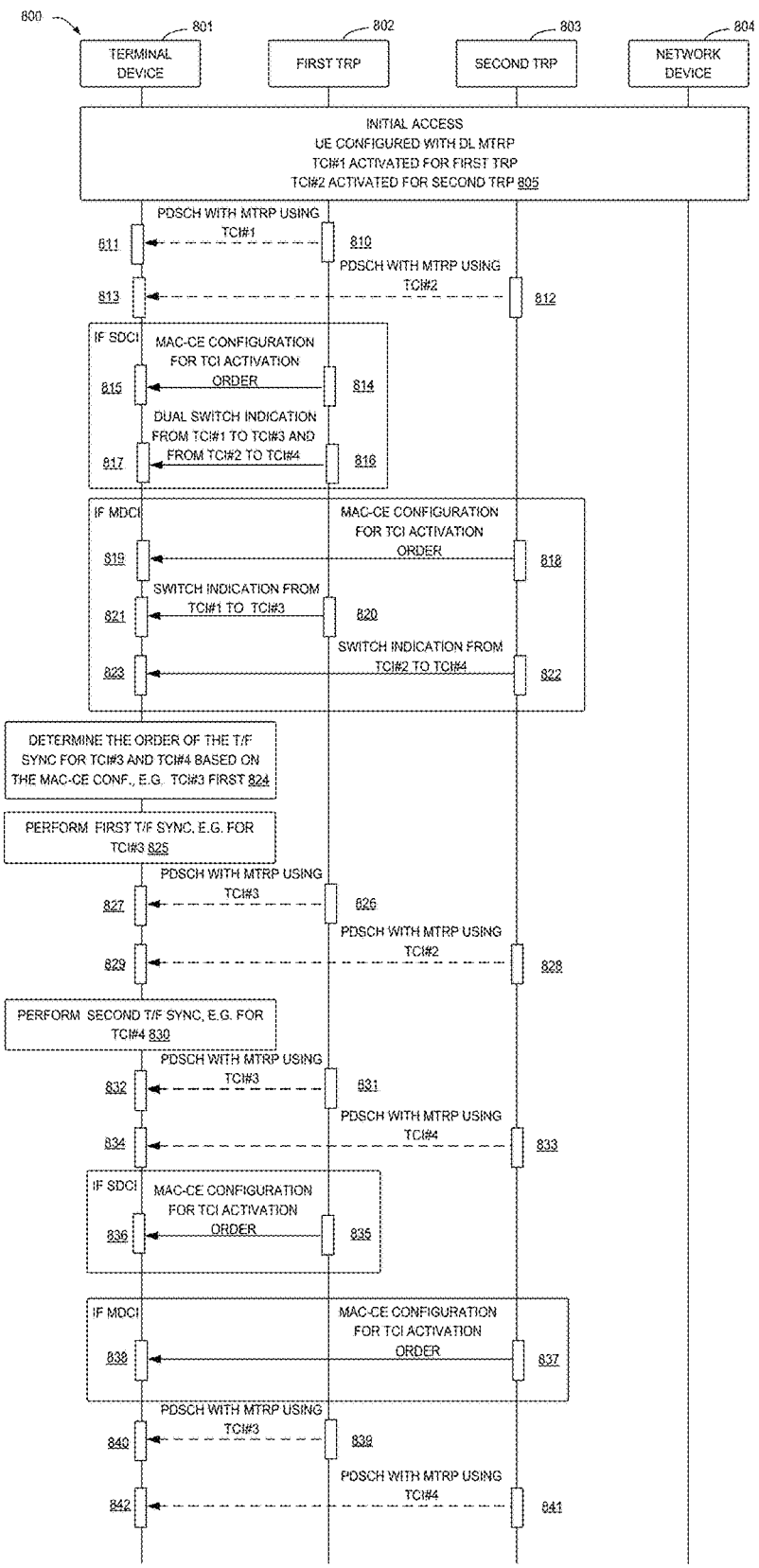
FIG. 8 illustrates a signaling flow for a configuration of a TCI activation ordering according to some example embodiments of the present disclosure.

According to the embodiments described in FIG. 7, the terminal device 701 is configured via a RRC configuration by the network device 704. However, the terminal device may also be configured via a MAC-CE by the network device. FIG. 8 illustrates such case, which shows a signaling flow 800 for a configuration of a TCI activation ordering according to some example embodiments of the present disclosure. The signaling flow involves a terminal device 801, a first TRP 802, a second TRP 803 and a network device 804. The terminal device 801 may be an example of the first apparatus 110 as described in FIG. 1. The first TRP 802 and the second TRP 803 may be examples of the network device 130 in FIG. 1. The network device 804 may be an example of the second apparatus 120 as described in FIG. 1. TCI #1 may be an example of the first source TCI state as described above. TCI #3 may be an example of the first target TCI state as described above. TCI #2 may be an example of the second source TCI state as described above. TCI #4 may be an example of the second target TCI state as described above.

As shown in FIG. 8, an initial access is completed and the terminal device 801 is configured with DL mTRP at 805. A TCI #1 is activated for the first TRP 802 and a TCI #2 activated for the second TRP 803. After the initial access and the configuration for the terminal device 801, the first TRP 802 transmits (810) PDSCH with mTRP using the TCI #1 and the terminal device 801 receives (811) the PDSCH from the first TRP 802. The second TRP 803 transmits (812) PDSCH with mTRP using the TCI #2 and the terminal device 801 receives (813) the PDSCH from the second TRP 803.

In the sDCI mode, the first TRP 802 transmits (814) a MAC-CE configuration for TCI activation order to the terminal device 801. The MAC-CE configuration indicates which one of the TCI states should be activated/switched first. The terminal device 801 receives (815) the MAC-CE configuration. Then, the first TRP 802 transmits (816) a dual switch indication from the TCI #1 to the TCI #3 and from the TCI #2 to the TCI #4. The dual switch indication is transmitted via a MAC-CE command. The terminal device 801 receives (819) the dual switch indication. Although such MAC-CE configuration is shown to be transmitted just before the dual switch indication transmitted by the first TRP 802 in FIG. 8, the MAC-CE configuration may be transmitted before, after, or as part of that dual switch indication. The MAC-CE configuration is included in a MAC CE command.

In the mDCI mode, the second TRP 803 transmits (818) a MAC-CE configuration for TCI activation order to the terminal device 801. The MAC-CE configuration indicates which one of the TCI states should be activated/switched first. The terminal device 801 receives (819) the MAC-CE configuration. Then, the first TRP 802 transmits (820) a switch indication from the TCI #1 to the TCI #3 and the terminal device 801 receives (821) the switch indication. The second TRP 803 transmits (822) a switch indication from the TCI #2 to the TCI #4 and the terminal device 801 receives (823) the switch indication. The switch indications are transmitted via MAC-CE commands. Although such MAC-CE configuration is shown to be transmitted by the second TRP 803 in FIG. 8, several other embodiments are possible. In some example embodiments, the MAC-CE configuration may be a separate command sent by only one TRP, i.e., either the first TRP 802 or the second TRP 803. In further example embodiments, such MAC-CE configuration may be sent by only one TRP as part of the switch indication. Alternatively, each TRP may send one MAC-CE configuration, for example with a priority (at least with two levels "high" or "low") for its TCI state switch. In case that the two priorities are the same, it is up to the terminal device 801 to determine which TCI state will be switched first, and then it may optionally signal the determination back to the network device 804.

After receiving the MAC-CE configuration to switch both TCI states (in the form of a single MAC-CE configuration for sDCI or in the form of separate MAC-CE configurations for mDCI), the terminal device 801 determines (824) the order of the T/F synchronization for the TCI #3 and the TCI #4 based on the MAC-CE configuration, e.g. the TCI #3 is to be switched first. The terminal device 801 determines which TCI state is to be switched/activated first.

The terminal device 801 performs (825) the first T/F synchronization, for example, for the TCI #3 and complete the first TCI switch, such that the first TRP 802 transmits (826) PDSCH with the TCI #3 and the terminal device 801 receives (827) the PDSCH with the updated TCI state. At this point, the second TRP 803 continues to transmit (828) PDSCH with mTRP using the TCI #2 and the terminal device 801 continues to receive (829) the PDSCH from the second TRP 803.

The terminal device 801 then performs (830) the second T/F synchronization for example, for the TCI #4 and completes the switch from the TCI #2 to the TCI #4, such that the first TRP 802 transmits (831) PDSCH with the TCI #3 and the terminal device 801 receives (832) the PDSCH with the updated TCI state and the second TRP 803 transmits (833) PDSCH with the TCI #4 and the terminal device 801 receives (834) the PDSCH with the updated TCI states.

When compared to RRC, it is possible to reconfigure the terminal device 801 more dynamically with the MAC-CE configuration. As shown in FIG. 8, in the sDCI mode, the first TRP 802 transmits (835) a MAC-CE configuration for TCI activation order to the terminal device 801 and the terminal device 801 receives (836) the MAC-CE configuration. In the mDCI mode, the second TRP 803 transmits (837) a MAC-CE configuration for TCI activation order to the terminal device 801 and the terminal device 801 receives (838) the MAC-CE configuration. In the above cases, the network device 804 may send a MAC-CE command indicating which TCI state should be activated/switched first, even without an actual switch indication sent just before or after.

Then, the first TRP 802 transmits (839) PDSCH with the TCI #3 and the terminal device 801 receives (840) the PDSCH with the TCI #3 and the second TRP 803 transmits (841) PDSCH with the TCI #4 and the terminal device 801 receives (842) the PDSCH with the TCI #4.

According to the embodiments described in FIGS. 7-8, the terminal device is configured via a RRC configuration or a MAC-CE configuration by the network device. However, in some alternative solutions, the terminal device may inform the network device about which TCI state is to be activated/switched first.

Figure 9:
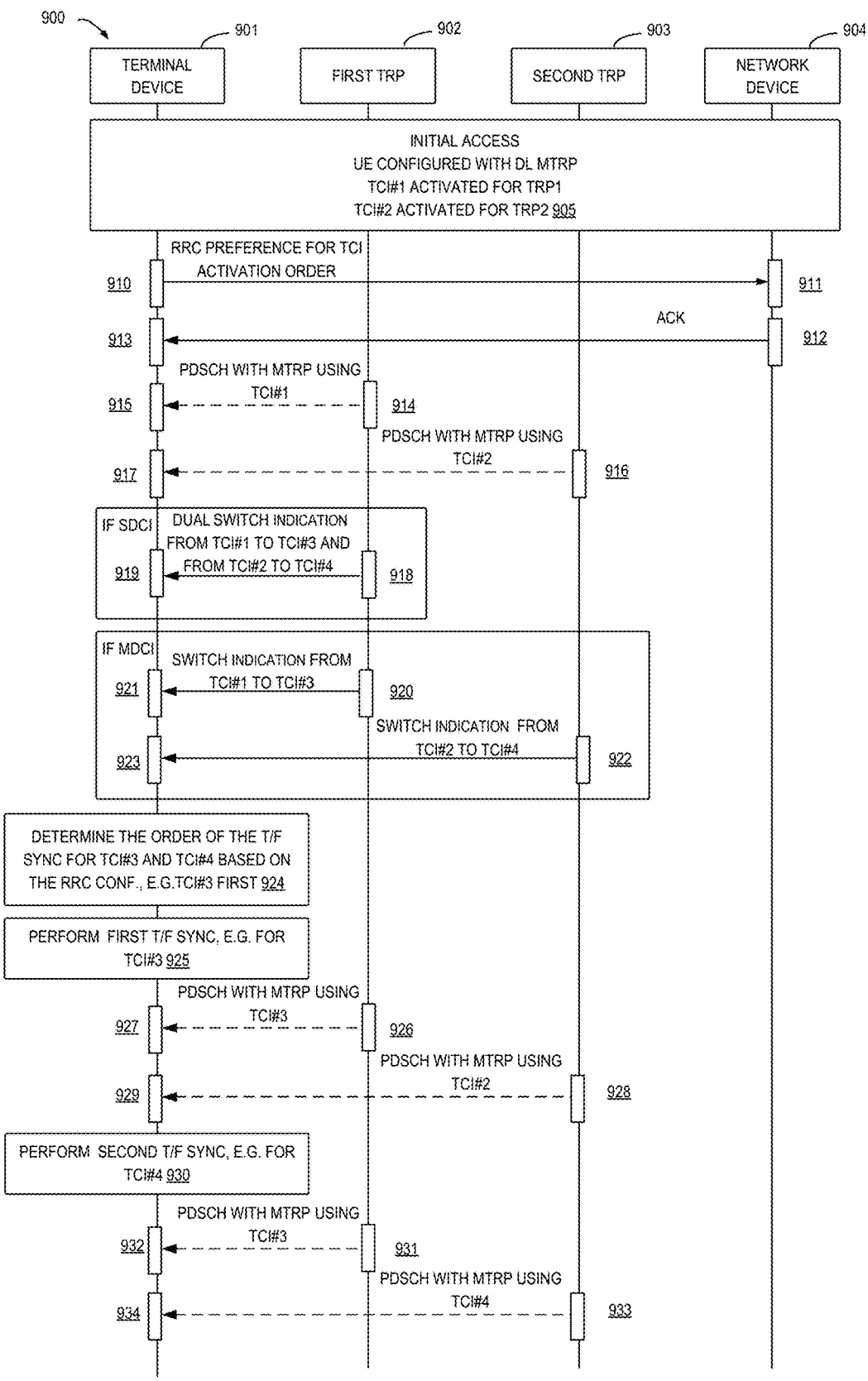
FIG. 9 illustrates a signaling flow for a configuration of a TCI activation ordering according to some example embodiments of the present disclosure.

FIG. 9 illustrates such case, which shows a signaling flow 900 for a configuration of a TCI activation ordering according to some example embodiments of the present disclosure. The signaling flow involves a terminal device 901, a first TRP 902, a second TRP 903 and a network device 904. The terminal device 901 may be an example of the first apparatus 110 as described in FIG. 1. The first TRP 902 and the second TRP 903 may be examples of the network device 130 in FIG. 1. The network device 904 may be an example of the second apparatus 120 as described in FIG. 1. TCI #1 may be an example of the first source TCI state as described above. TCI #3 may be an example of the first target TCI state as described above. TCI #2 may be an example of the second source TCI state as described above. TCI #4 may be an example of the second target TCI state as described above.

At 905, an initial access is completed and the terminal device 901 is configured with DL mTRP. The TCI #1 is activated for the first TRP 902 and a TCI #2 activated for the second TRP 903. After the initial access and the configuration for the terminal device 901, the terminal device 901 transmit (910) a RRC preference for TCI activation order to the network device 904. The RRC preference indicates which TCI of target TCI states should be activated/switched first. The RRC preference may be an example of the information of the order as described above.

The network device 904 receives (911) the RRC preference for TCI activation order and transmit (912) an acknowledgement (ACK) to the terminal device 901. Then, the terminal device 901 receives (913) the ACK. The first TRP 902 transmits (914) PDSCH with mTRP using the TCI #1 and the terminal device 901 receives (915) the PDSCH from the first TRP 902. The second TRP 903 transmits (916) PDSCH with mTRP using the TCI #2 and the terminal device 901 receives (917) the PDSCH from the second TRP 903.

In the sDCI mode, the first TRP 902 transmits (918) a dual switch indication from the TCI #1 to the TCI #3 and from the TCI #2 to the TCI #4. The dual switch indication is transmitted via a MAC-CE command. The terminal device 901 receives (919) the dual switch indication. In the mDCI mode, the first TRP 902 transmits (920) a switch indication from the TCI #1 to the TCI #3 and the terminal device 901 receives (921) the switch indication. The second TRP 903 transmits (922) a switch indication from the TCI #2 to the TCI #4 and the terminal device 901 receives (923) the switch indication. Both the switch indications are transmitted via MAC-CE commands.

After receiving the MAC-CE command to switch both the TCI states (in the form of a single MAC-CE for the sDCI mode or in the form of separate MAC-CEs for the mDCI mode), the terminal device 901 determines (924) the order of T/F synchronization for the TCI #3 and the TCI #4 based on the RRC configuration. For example, the terminal device 901 may determine to switch the TCI #3 first. That is, the terminal device 901 determines which one of the TCI states is to be switched/activated first. How the terminal device 901 can determine which TCI state is to be activated/switched first has been described above.

The terminal device 901 performs (925) the first T/F synchronization, for example, for the TCI #3 and completes the switch from the TCI #1 to the TCI #3, such that the first TRP 902 transmits (926) PDSCH with the TCI #3 and the terminal device 901 receives (927) the PDSCH with the updated TCI state. At this point, the second TRP 903 continues to transmit (928) PDSCH with mTRP using the TCI #2 and the terminal device 901 continues to receive (929) the PDSCH from the second TRP 903.

The terminal device 901 then performs (930) the second T/F synchronization for example, for the TCI #4 and completes the switch from the TCI #2 to the TCI #4, such that the first TRP 902 transmits (931) PDSCH with the TCI #3 and the terminal device 901 receives (932) the PDSCH with the updated TCI state and the second TRP 903 transmits (933) PDSCH with the TCI #4 and the terminal device 901 receives (934) the PDSCH with the updated TCI states.

Figure 10:
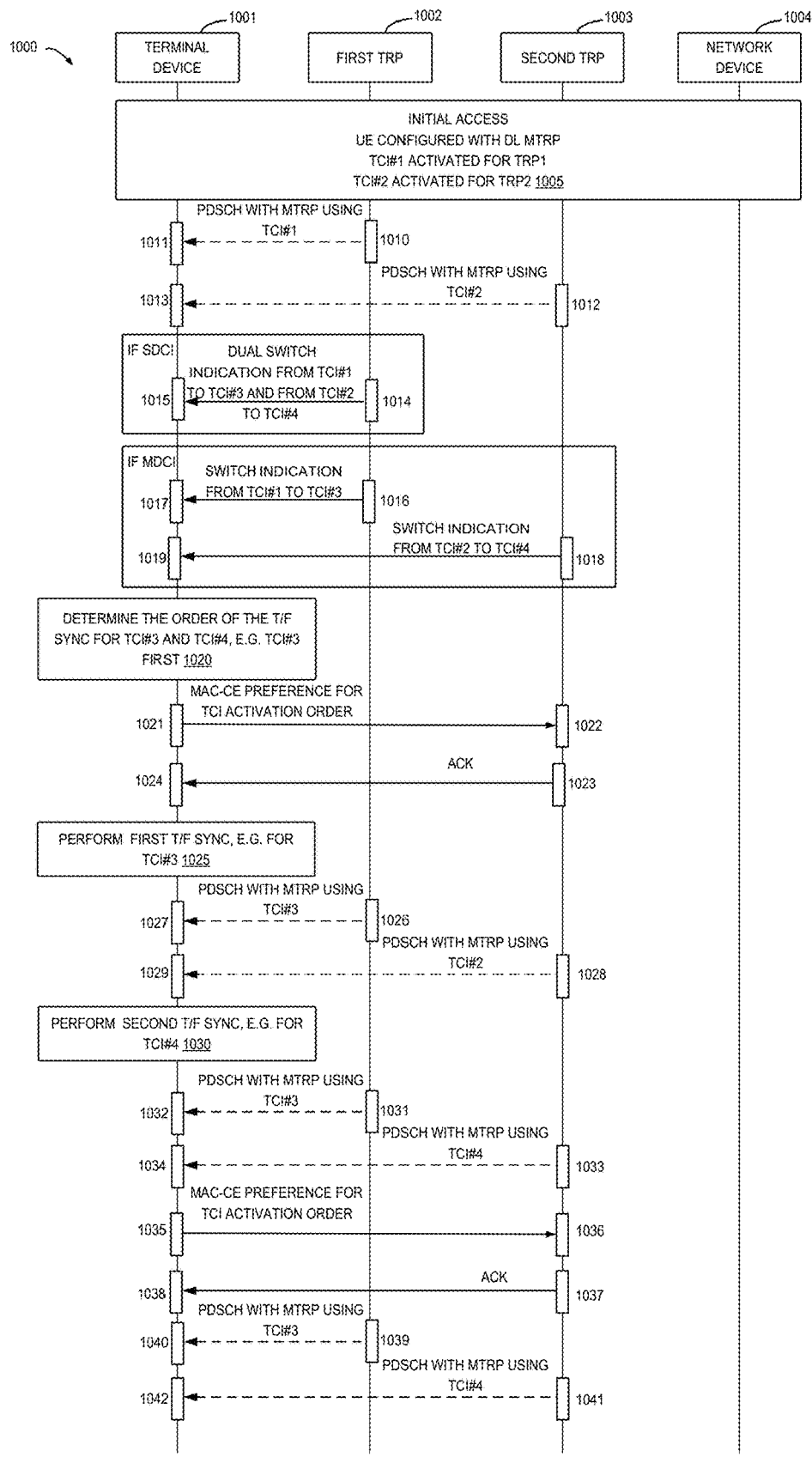
FIG. 10 illustrates a signaling flow for a configuration of a TCI activation ordering according to some example embodiments of the present disclosure.

According to the embodiments described in FIG. 9, the terminal device 901 informs the network device 904 via RRC about which TCI state it will activate/switch first. However, the terminal device may also inform the network device via MAC-CE about which TCI state it will activate/switch first. FIG. 10 illustrates such case, which shows a signaling flow 1000 for a configuration of a TCI activation ordering according to some example embodiments of the present disclosure. The signaling flow involves a terminal device 1001, a first TRP 1002, a second TRP 1003 and a network device 1004. The terminal device 1001 may be an example of the first apparatus 110 as described in FIG. 1. The first TRP 1002 and the second TRP 1003 may be examples of the network device 130 in FIG. 1. The network device 1004 may be an example of the second apparatus 120 as described in FIG. 1. TCI #1 may be an example of the first source TCI state as described above. TCI #3 may be an example of the first target TCI state as described above. TCI #2 may be an example of the second source TCI state as described above. TCI #4 may be an example of the second target TCI state as described above.

As shown in FIG. 10, an initial access is completed and the terminal device 1001 is configured with DL mTRP at 1005. A TCI #1 is activated for the first TRP 1002 and a TCI #2 activated for the second TRP 1003. After the initial access and the configuration for the terminal device 1001, the first TRP 1002 transmits (1010) PDSCH with mTRP using the TCI #1 and the terminal device 1001 receives (1011) the PDSCH from the first TRP 1002. The second TRP 1003 transmits (1012) PDSCH with mTRP using the TCI #2 and the terminal device 1001 receives (1013) the PDSCH from the second TRP 1003.

In the sDCI mode, the first TRP 1002 transmits (1014) a dual switch indication from the TCI #1 to the TCI #3 and from the TCI #2 to the TCI #4. The terminal device 1001 receives (1015) the dual switch indication. The dual switch indication is transmitted via a MAC-CE command.

In the mDCI mode, the first TRP 1002 transmits (1016) a switch indication from the TCI #1 to the TCI #3 and the terminal device 1001 receives (1017) the switch indication. The second TRP 1003 transmits (1018) a switch indication from the TCI #2 to the TCI #4 and the terminal device 1001 receives (1019) the switch indication. Both the switch indications are transmitted via a MAC-CE command.

After receiving the MAC-CE configuration to switch both TCI states (in the form of a single MAC-CE configuration for sDCI or in the form of separate MAC-CE configurations for mDCI), the terminal device 1001 determines (1020) the order of the T/F synchronization for the TCI #3 and the TCI #4, e.g. the TCI #3 is to be switched first. The terminal device 1001 determines which TCI state is to be switched/activated first. How the terminal device 1001 can determine which TCI state is to be activated/switched first has been described above.

The terminal device 1001 transmits (1021) a MAC-CE preference for TCI activation order to the second TRP 1003. The second TRP 1003 receives (1022) the MAC-CE preference for TCI activation order and transmit (1023) an ACK to the terminal device 1001. The terminal device 1001 receives (1024) the ACK. The terminal device 1001 informs the network device 1004 via a MAC CE command to indicate which TCI state it will activate/switch first. Such MAC CE command may be sent to only one TRP (which fits for the sDCI mode better). Two MAC CE commands may be sent, one for each TRP (which fits for the mDCI mode better).

The terminal device 1001 performs (1025) the first T/F synchronization, for example, for the TCI #3 and complete the first TCI switch, such that the first TRP 1002 transmits (1026) PDSCH with the TCI #3 and the terminal device 1001 receives (1027) the PDSCH with the updated TCI state. At this point, the second TRP 1003 continues to transmit (1028) PDSCH with mTRP using the TCI #2 and the terminal device 1001 continues to receive (1029) the PDSCH from the second TRP 1003.

The terminal device 1001 then performs (1030) the second T/F synchronization for example, for the TCI #4 and completes the switch from the TCI #2 to the TCI #4, such that the first TRP 1002 transmits (1031) PDSCH with the TCI #3 and the terminal device 1001 receives (1032) the PDSCH with the updated TCI state and the second TRP 1003 transmits (1033) PDSCH with the TCI #4 and the terminal device 1001 receives (1034) the PDSCH with the updated TCI states.

When compared to RRC, it is possible that the terminal device 1001 sends its preference more dynamically with the MAC-CE configuration. As shown in FIG. 10, the terminal device 1001 transmits (1035) a MAC-CE preference for TCI activation order to the second TRP 1003. The second TRP 1003 receives (1036) the MAC-CE preference for TCI activation order and transmit (1037) an ACK to the terminal device 1001. The terminal device 1001 receives (1038) the ACK. The terminal device 1001 may send to the network device 1004 a MAC-CE preference indicating which TCI state it will activate/switch first, even without an actual dual switch indication for sDCI sent just before, for example. The first TRP 1002 transmits (1039) PDSCH with the TCI #3 and the terminal device 1001 receives (1040) the PDSCH with the TCI #3 and the second TRP 1003 transmits (1041) PDSCH with the TCI #4 and the terminal device 1001 receives (1042) the PDSCH with TCI #4.

According to the embodiments described in FIGS. 9-10, the terminal device informs the network device via a RRC configuration or a MAC-CE configuration about which TCI state it will activate/switch first.

Although the embodiments in FIGS. 7-10 illustrates a mTRP scenario with up to 2 TRPs and up to 2 TCI state switches, the solutions may be extended to a general number of TCI states. For example, the RRC signaling in FIGS. 7-8 and the MAC-CE signaling in FIGS. 9-10 may indicate either the TCI state that will be activated/switched first (which is enough with just 2 switches to define an order) or actual TCI state switch orders for more than 2 switches.

Figure 11:
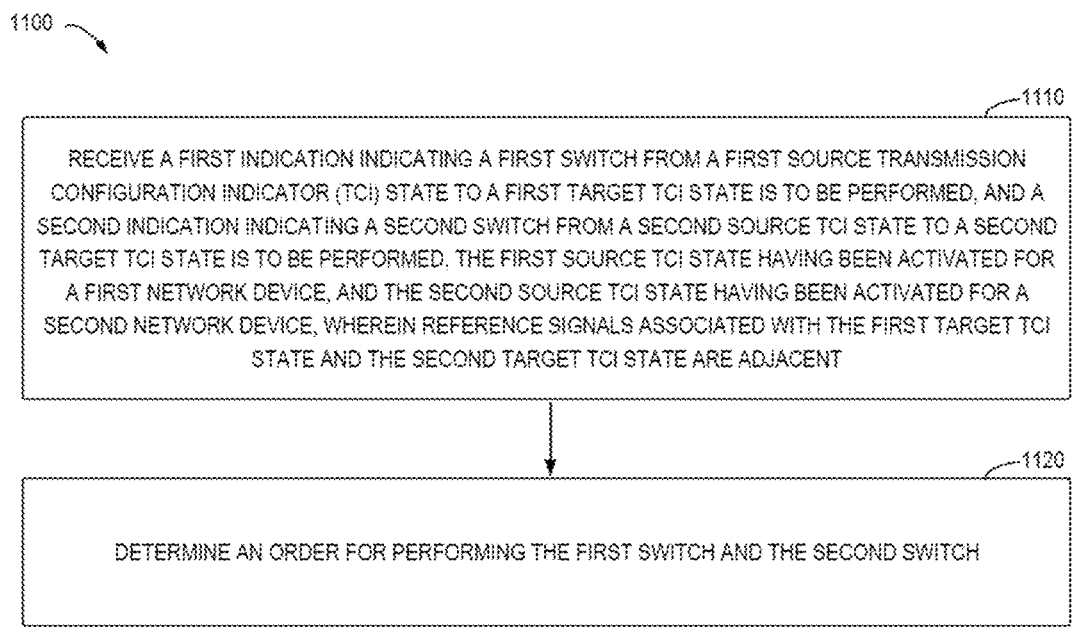
FIG. 11 illustrates a flowchart of a method implemented at a first apparatus according to some example embodiments of the present disclosure.

FIG. 11 shows a flowchart of an example method 1100 implemented at a first apparatus in accordance with some example embodiments of the present disclosure. For the purpose of discussion, the method 1100 will be described from the perspective of the first apparatus 110 in FIG. 1.

At block 1110, the first apparatus 110 receives a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent.

At block 1120, the first apparatus 110 determines an order for performing the first switch and the second switch.

In some example embodiments, the first apparatus 110 may further receive, from a second apparatus, a configuration of the order; and determines the order based on the configuration.

In some example embodiments, the order indicates the first switch is to be performed before the second switch in a case that: the first source TCI state has a higher control resource set (CORESET) pool index than the second source TCI state, or the first target TCI state has a higher CORESET pool index than the second target TCI state; or the first source TCI state has a lower CORESET pool index than the second source TCI state, or the first target TCI state has a lower CORESET pool index than the second target TCI state; or the first source TCI state has a higher timing advance group identification than the second source TCI state, or the first target TCI state has a higher timing advance group identification than the second target TCI state; or the first source TCI state has a lower timing advance group identification than the second source TCI state, or the first target TCI state has a lower timing advance group identification than the second target TCI state; or the first source TCI state or the first target TCI state is associated with a network device for which uplink is configured; or the first source TCI state or the first target TCI state is activated for the first network device which carries downlink control information, the first source TCI state for which a worse link quality has been measured than the second source TCI state, or the first target TCI state for which a worse link quality has been measured than the second target TCI state; or the first source TCI state for which a better link quality has been measured than the second source TCI state, or the first target TCI state for which a better link quality has been measured than the second target TCI state; or the first source TCI state for which a worse predicted link quality has been measured than the second source TCI state, or the first target TCI state for which a worse predicted link quality has been measured than the second target TCI state; or the first source TCI state for which a better predicted link quality has been measured than the second source TCI state, or the first target TCI state for which a better predicted link quality has been measured than the second target TCI state; or the first source TCI state is associated with a network device for which a lower power headroom is reported than the second source TCI state, or the first target TCI state is associated with a network device for which a lower power headroom is reported than the second target TCI state; or the first source TCI state is associated with a network device for which a higher power headroom is reported than the second source TCI state, or the first target TCI state is associated with a network device for which a higher power headroom is reported than the second target TCI state.

In some example embodiments, the configuration is comprised in a Radio Resource Control (RRC) message, or one or more Medium Access Control (MAC) Control Element (CE) commands.

In some example embodiments, the first apparatus 110 may further receive the configuration in a Medium Access Control (MAC) Control Element (CE) command from one of the first network device and the second network device; or receive the configuration in a MAC CE command from one of the first network device and the second network device, the MAC CE command further comprising a TCI state switch command; or receive the configuration in a first MAC CE command from the first network device and a second MAC CE command from the second network device, the first MAC CE command and the second MAC CE command having different priorities.

In some example embodiments, the first apparatus 110 may further receive an updated configuration of the order in a Medium Access Control (MAC) Control Element (CE) command from one of the first network device and the second network device; or receive the updated configuration of the order in a third MAC CE command from the first network device and a fourth MAC CE command from the second network device, the third MAC CE command and the fourth MAC CE command having different priorities.

In some example embodiments, the first apparatus 110 may further determine the order based on at least one of first information about a first transmission between the first network device and the first apparatus or second information about a second transmission between the second network device and the first apparatus.

In some example embodiments, the first apparatus 110 may further transmit information of the order to at least one of the first network device, the second network device, or a second apparatus.

In some example embodiments, the order is comprised in a Radio Resource Control (RRC) message or in a Medium Access Control (MAC) Control Element (CE) command.

In some example embodiments, the first apparatus 110 may further determine an updated order for the order based on at least one of updated information about the first transmission between the first network device and the first apparatus or updated information about the second transmission between the second network device and the first apparatus; transmit the updated order in a Medium Access Control (MAC) Control Element (CE) command to at least one of the first network device, the second network device, or a second apparatus.

In some example embodiments, the first information comprises at least one of the following associated with the first transmission: a link quality, a power headroom, a control resource set (CORESET) pool index, timing advance group identification, information on whether the first network device carries downlink control information, and wherein the second information comprises at least one of the following associated with the second transmission: a link quality, a power headroom, a control resource set (CORESET) pool index, timing advance group identification, information on whether the first network device carries downlink control information.

In some example embodiments, the first apparatus 110 may further receive the first indication and the second indication in a single Medium Access Control (MAC) Control Element (CE) command from one of the first network device and the second network device; or receive the first indication in a MAC CE command from the first network device and the second indication in a further MAC CE command form the second network device.

In some example embodiments, the first apparatus 110 may further perform a first synchronization for the first switch and a second synchronization for the second switch based on the order.

In some example embodiments, the first apparatus 110 may further: in accordance with a determination that the order indicates the first switch is to be performed before the second switch, receive, after performing the first synchronization and before performing the second synchronization, a transmission from the first network device with the first target TCI state and a transmission from the second network device with the second source TCI state; and receive, after performing the first synchronization and the second synchronization, a transmission from the first network device with the first target TCI state and a transmission from the second network device with the second target TCI state.

In some example embodiments, the reference signals comprise Synchronization Signal and Physical Broadcast Channel (PBCH) blocks (SSBs).

In some example embodiments, the first apparatus comprises a terminal device.

Figure 12:
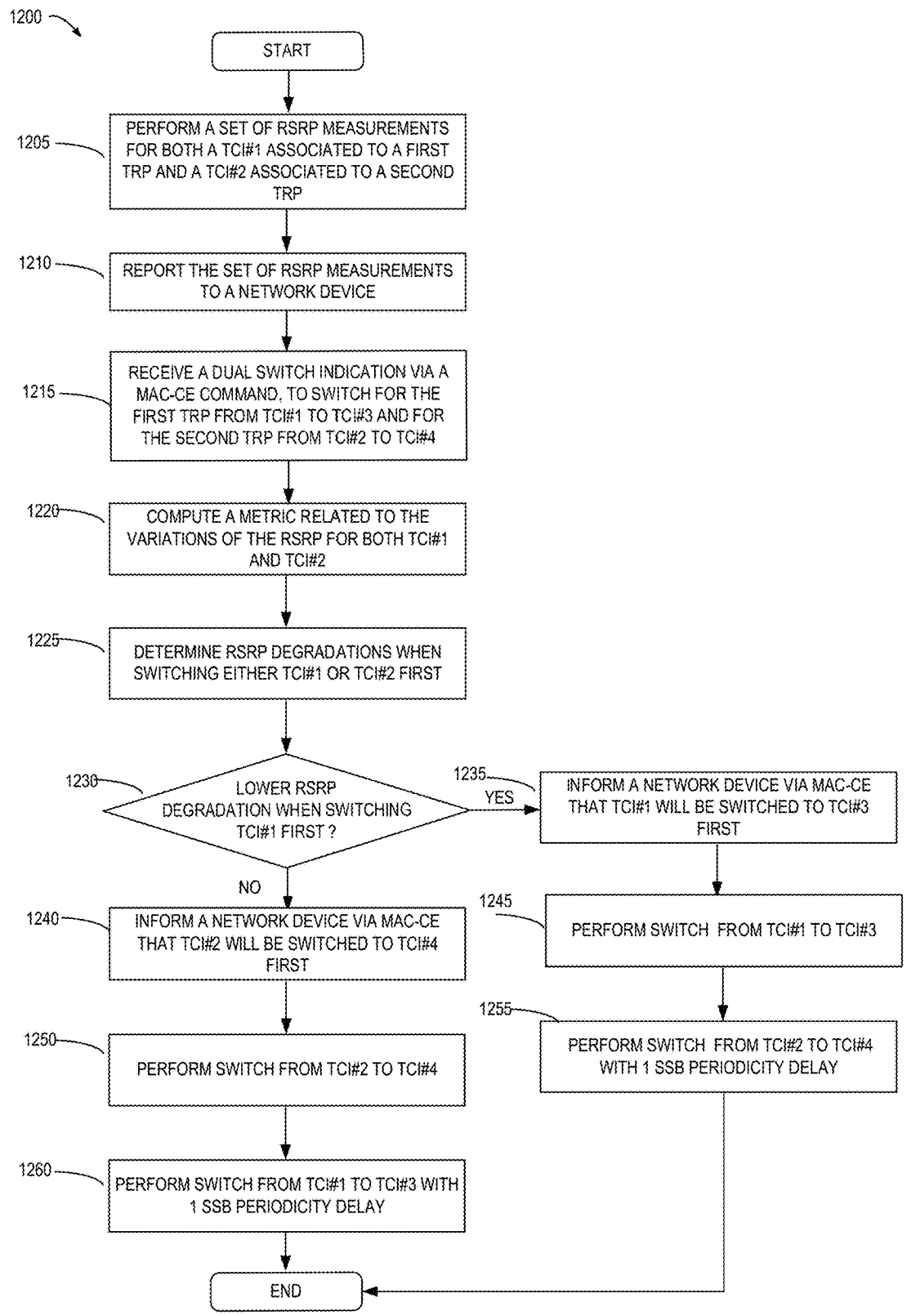
FIG. 12 illustrates another flowchart of a method implemented at a first apparatus according to some example embodiments of the present disclosure.

FIG. 12 illustrates another flowchart of a method implemented at a first apparatus according to some example embodiments of the present disclosure. The flowchart 900 is performed by a terminal device (e.g., a UE), which may be an example of a first apparatus 110 in FIG. 1. In example embodiments discussed with respect to FIG. 12, the terminal device may inform the network about the determination.

FIG. 12 shows the operations performed by the terminal device for a sDCI mTRP scenario, with the selection of which TCI state to activate/switch first being based on a set of RSRP measurements. The set of RSRP measurements is used to determine which link is degrading faster. Note that similar flowcharts can be made considering different parameters, for example RSRQ, RSSI or SINR, or for a mDCI mTRP scenario. In this flowchart 1200, the following operations are performed.

The terminal device is first configured in DL with sDCI in a mTRP scenario with TCI #1 associated to a first TRP and TCI #2 associated to a second TRP. The TCI #1 and the TCI #2 may be examples of the first source TCI state and the second source TCI state described above respectively. The first TRP and the second TRP may be examples of the network devices 130 in FIG. 1.

At block 1205, the terminal device performs a set of RSRP measurements for both TCI #1 associated to a first TRP and TCI #2 associated to a second TRP. The set of RSRP measurements will be used for determining the best pair of TCI states for receiving data from first TRP and second TRP.

At block 1210, the terminal device reports the sets of RSRP measurements to a network device in accordance with the configuration by the network device.

At block 1215, the terminal device receives a dual switch indication via a MAC-CE command from the network device, to switch for the first TRP from TCI #1 to TCI #3 and for the second TRP from TCI #2 to TCI #4. The network device may use the information received at block 1210 to determine the best pair of target TCI states TCI #3 and TCI #4.

At block 1220, the terminal device computes a metric related to the variations of the RSRP for both TCI #1 and TCI #2. Prediction results of RSRP values may be computed. A liner interpolation may be considered as prediction method. More advanced prediction methods may also be used, such as polynomial or spline interpolation. The terminal device and the network device are aware of the SSB overlap for TCI #3 and TCI #4, and the terminal device predicts the RSRP values for TCI #1 and TCI #2 in order to determine the TCI switching order.

At block 1225, the terminal device determines, for a TCI switching order, a RSRP degradation when switching either TCI #1 or TCI #2 first.

At block 1230, the terminal device determines whether there is a lower RSRP degradation when switching TCI #1 first. That is, based on the RSRP degradation determined at block 1225, the terminal device determines which TCI state should be switched first by comparing min($RSRP_{TCI\ \#1,pred}^{TCI\ \#1,first}, RSRP_{TCI\ \#2,pred}^{TCI\ \#1,first}$) with min($RSRP_{TCI\ \#1,pred}^{TCI\ \#2,first}, RSRP_{TCI\ \#2,pred}^{TCI\ \#2,first}$).

Expressions $RSRP_{k,pred}^{x,first}$ represent the RSRP predicted for TCI #k (wherein "pred" represents predicted) assuming that TCI #x is switched first ("first" represents switched first).

At block 1235, if min($RSRP_{TCI\ \#1,pred}^{TCI\ \#1,first}, RSRP_{TCI\ \#2,pred}^{TCI\ \#1,first}$)≥min($RSRP_{TCI\ \#1,pred}^{TCI\ \#2,first}, RSRP_{TCI\ \#2,pred}^{TCI\ \#2,first}$), the terminal device informs the network device via MAC CE that TCI #1 will be switched to TCI #3 first, otherwise the terminal device jumps to block 1240. At block 1245, the terminal device performs switch from TCI #1 to TCI #3 before the switch from TCI #2 to TCI #4.

At block 1255, following block 1245, the terminal device performs the switch from TCI #2 to TCI #4 with 1 SSB periodicity delay after the switch from TCI #1 to TCI #3. After this, both the TCI switches are concluded.

At block 1240, if min($RSRP_{TCI\ \#1,pred}^{TCI\ \#1,first}, RSRP_{TCI\ \#2,pred}^{TCI\ \#1,first}$)<min($RSRP_{TCI\ \#1,pred}^{TCI\ \#2,first}, RSRP_{TCI\ \#2,pred}^{TCI\ \#2,first}$), the terminal device informs the network device via MAC CE that TCI #2 will be switched to TCI #4 first. At block 1250, the terminal device performs the switch from TCI #2 to TCI #4.

At block 1260, following block 1250, the terminal device performs the switch from TCI #1 to TCI #3 1 with 1 SSB periodicity delay after the switch from TCI #2 to TCI #4. After this, both the TCI switches are concluded.

Figure 13:
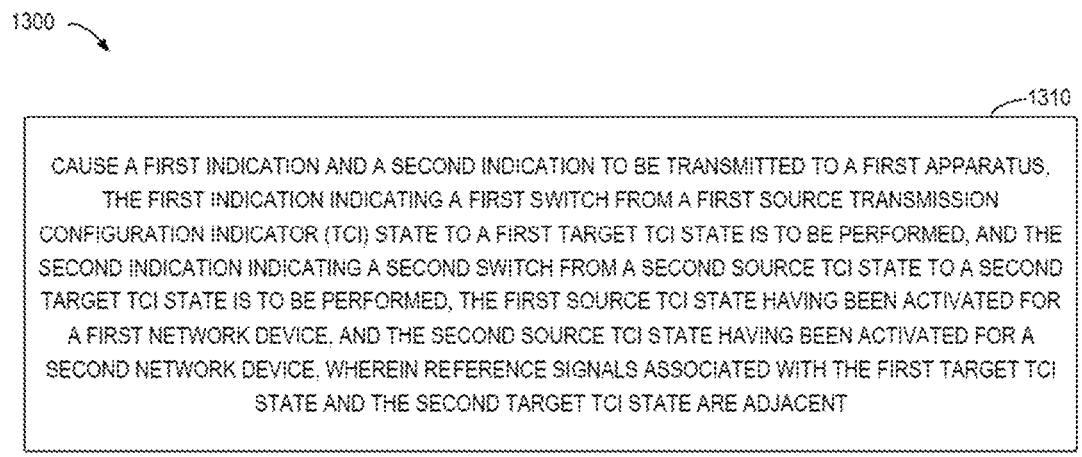
FIG. 13 illustrates a flowchart of a method implemented at a second apparatus according to some example embodiments of the present disclosure.

FIG. 13 shows a flowchart of an example method 1300 implemented at a second apparatus in accordance with some example embodiments of the present disclosure. For the purpose of discussion, the method 1300 will be described from the perspective of the second apparatus 120 in FIG. 1.

At block 1310, the second apparatus 120 causes a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent.

In some example embodiments, the second apparatus 120 may further transmit, to the first apparatus, a configuration of an order for performing the first switch and the second switch.

In some example embodiments, the order indicates the first switch is to be performed before the second switch in a case that: the first source TCI state has a higher control resource set (CORESET) pool index than the second source TCI state, or the first target TCI state has a higher CORESET pool index than the second target TCI state; or the first source TCI state has a lower CORESET pool index than the second source TCI state, or the first target TCI state has a lower CORESET pool index than the second target TCI state; or the first source TCI state has a higher timing advance group identification than the second source TCI state, or the first target TCI state has a higher timing advance group identification than the second target TCI state; or the first source TCI state has a lower timing advance group identification than the second source TCI state, or the first target TCI state has a lower timing advance group identification than the second target TCI state; or the first source TCI state or the first target TCI state is associated with a network device for which uplink is configured; or the first source TCI state or the first target TCI state is activated for the first network device which carries a downlink control channel, the first source TCI state for which a worse link quality has been measured than the second source TCI state, or the first target TCI state for which a worse link quality has been measured than the second target TCI state; or the first source TCI state for which a better link quality has been measured than the second source TCI state, or the first target TCI state for which a better link quality has been measured than the second target TCI state; or the first source TCI state for which a worse predicted link quality has been measured than the second source TCI state, or the first target TCI state for which a worse predicted link quality has been measured than the second target TCI state; or the first source TCI state for which a better predicted link quality has been measured than the second source TCI state, or the first target TCI state for which a better predicted link quality has been measured than the second target TCI state; or the first source TCI state is associated with a network device for which a lower power headroom is reported than the second source TCI state, or the first target TCI state is associated with a network device for which a lower power headroom is reported than the second target TCI state; or the first source TCI state is associated with a network device for which a higher power headroom is reported than the second source TCI state, or the first target TCI state is associated with a network device for which a higher power headroom is reported than the second target TCI state.

In some example embodiments, the configuration is comprised in a Radio Resource Control (RRC) message, or one or more Medium Access Control (MAC) Control Element (CE) commands.

In some example embodiments, the configuration is transmitted in a Medium Access Control (MAC) Control Element (CE) command from one of the first network device and the second network device; or the configuration is transmitted in a MAC CE command from one of the first network device and the second network device, the MAC CE command further comprising a TCI state switch command; or the configuration is transmitted in a first MAC CE command from the first network device and a second MAC CE command from the second network device, the first MAC CE command and the second MAC CE command having different priorities.

In some example embodiments, the second apparatus 120 may further cause an updated configuration of the order to be transmitted to the first apparatus.

In some example embodiments, the second apparatus 120 may further cause the updated configuration to be transmitted in a Medium Access Control (MAC) Control Element (CE) command from one of the first network device and the second network device; or cause the updated configuration to be transmitted in a third MAC CE command from the first network device and a fourth MAC CE command from the second network device, the third MAC CE command and the fourth MAC CE command having different priorities.

In some example embodiments, the second apparatus 120 may further receive information of the order from the first apparatus.

In some example embodiments, the information of the order is comprised in a Radio Resource Control (RRC) message or in a Medium Access Control (MAC) Control Element (CE) command.

In some example embodiments, the second apparatus 120 may further receive information of an updated order of the order from the first apparatus, the information of the updated order is comprised in a Medium Access Control (MAC) Control Element (CE) command.

In some example embodiments, the first indication and the second indication are transmitted in a single Medium Access Control (MAC) Control Element (CE) command from one of the first network device and the second network device; or the first indication is transmitted in a MAC CE command from the first network device and the second indication is transmitted in a further MAC CE command form the second network device.

In some example embodiments, the reference signals comprise Synchronization Signal and Physical Broadcast Channel (PBCH) blocks (SSBs).

In some example embodiments, the first apparatus comprises a terminal device.

In some example embodiments, a first apparatus capable of performing any of the method 1300 (for example, the first apparatus 110 in FIG. 1) may comprise means for performing the respective operations of the method 1300. The means may be implemented in any suitable form. For example, the means may be implemented in a circuitry or software module. The first apparatus may be implemented as or included in the first apparatus 110 in FIG. 1.

In some example embodiments, the first apparatus comprises means for receiving a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and means for determining an order for performing the first switch and the second switch.

In some example embodiments, the first apparatus further comprises: means for receiving, from a second apparatus, a configuration of the order; and means for determining the order based on the configuration.

In some example embodiments, the order indicates the first switch is to be performed before the second switch in a case that: the first source TCI state has a higher control resource set (CORESET) pool index than the second source TCI state, or the first target TCI state has a higher CORESET pool index than the second target TCI state; or the first source TCI state has a lower CORESET pool index than the second source TCI state, or the first target TCI state has a lower CORESET pool index than the second target TCI state; or the first source TCI state has a higher timing advance group identification than the second source TCI state, or the first target TCI state has a higher timing advance group identification than the second target TCI state; or the first source TCI state has a lower timing advance group identification than the second source TCI state, or the first target TCI state has a lower timing advance group identification than the second target TCI state; or the first source TCI state or the first target TCI state is associated with a network device for which uplink is configured; or the first source TCI state or the first target TCI state is activated for the first network device which carries downlink control information, the first source TCI state for which a worse link quality has been measured than the second source TCI state, or the first target TCI state for which a worse link quality has been measured than the second target TCI state; or the first source TCI state for which a better link quality has been measured than the second source TCI state, or the first target TCI state for which a better link quality has been measured than the second target TCI state; or the first source TCI state for which a worse predicted link quality has been measured than the second source TCI state, or the first target TCI state for which a worse predicted link quality has been measured than the second target TCI state; or the first source TCI state for which a better predicted link quality has been measured than the second source TCI state, or the first target TCI state for which a better predicted link quality has been measured than the second target TCI state; or the first source TCI state is associated with a network device for which a lower power headroom is reported than the second source TCI state, or the first target TCI state is associated with a network device for which a lower power headroom is reported than the second target TCI state; or the first source TCI state is associated with a network device for which a higher power headroom is reported than the second source TCI state, or the first target TCI state is associated with a network device for which a higher power headroom is reported than the second target TCI state.

In some example embodiments, the configuration is comprised in a Radio Resource Control (RRC) message, or one or more Medium Access Control (MAC) Control Element (CE) commands.

In some example embodiments, the first apparatus further comprises: means for receiving the configuration in a Medium Access Control (MAC) Control Element (CE) command from one of the first network device and the second network device; or means for receiving the configuration in a MAC CE command from one of the first network device and the second network device, the MAC CE command further comprising a TCI state switch command; or means for receiving the configuration in a first MAC CE command from the first network device and a second MAC CE command from the second network device, the first MAC CE command and the second MAC CE command having different priorities.

In some example embodiments, the first apparatus further comprises: means for receiving an updated configuration of the order in a Medium Access Control (MAC) Control Element (CE) command from one of the first network device and the second network device; or means for receiving the updated configuration of the order in a third MAC CE command from the first network device and a fourth MAC CE command from the second network device, the third MAC CE command and the fourth MAC CE command having different priorities.

In some example embodiments, the first apparatus further comprises: means for determining the order based on at least one of first information about a first transmission between the first network device and the first apparatus or second information about a second transmission between the second network device and the first apparatus.

In some example embodiments, the first apparatus further comprises: means for transmitting information of the order to at least one of the first network device, the second network device, or a second apparatus.

In some example embodiments, the order is comprised in a Radio Resource Control (RRC) message or in a Medium Access Control (MAC) Control Element (CE) command.

In some example embodiments, the first apparatus further comprises: means for determining an updated order for the order based on at least one of updated information about the first transmission between the first network device and the first apparatus or updated information about the second transmission between the second network device and the first apparatus; means for transmitting the updated order in a Medium Access Control (MAC) Control Element (CE) command to at least one of the first network device, the second network device, or a second apparatus.

In some example embodiments, the first information comprises at least one of the following associated with the first transmission: a link quality, a power headroom, a control resource set (CORESET) pool index, timing advance group identification, information on whether the first network device carries downlink control information, and wherein the second information comprises at least one of the following associated with the second transmission: a link quality, a power headroom, a control resource set (CORESET) pool index, timing advance group identification, information on whether the first network device carries downlink control information.

In some example embodiments, the first apparatus further comprises: means for receiving the first indication and the second indication in a single Medium Access Control (MAC) Control Element (CE) command from one of the first network device and the second network device; or means for receiving the first indication in a MAC CE command from the first network device and the second indication in a further MAC CE command form the second network device.

In some example embodiments, the first apparatus further comprises: means for performing a first synchronization for the first switch and a second synchronization for the second switch based on the order.

In some example embodiments, the first apparatus further comprises: in accordance with a determination that the order indicates the first switch is to be performed before the second switch, means for receiving, after performing the first synchronization and before performing the second synchronization, a transmission from the first network device with the first target TCI state and a transmission from the second network device with the second source TCI state; and means for receiving, after performing the first synchronization and the second synchronization, a transmission from the first network device with the first target TCI state and a transmission from the second network device with the second target TCI state.

In some example embodiments, the reference signals comprise Synchronization Signal and Physical Broadcast Channel (PBCH) blocks (SSBs).

In some example embodiments, the first apparatus comprises a terminal device.

In some example embodiments, the first apparatus further comprises means for performing other operations in some example embodiments of the method 1300 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 1300 (for example, the second apparatus 120 in FIG. 1) may comprise means for performing the respective operations of the method 1300. The means may be implemented in any suitable form. For example, the means may be implemented in a circuitry or software module. The second apparatus may be implemented as or included in the second apparatus 120 in FIG. 1.

In some example embodiments, the second apparatus comprises means for causing a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent.

In some example embodiments, the second apparatus further comprises: means for transmitting, to the first apparatus, a configuration of an order for performing the first switch and the second switch.

In some example embodiments, the order indicates the first switch is to be performed before the second switch in a case that: the first source TCI state has a higher control resource set (CORESET) pool index than the second source TCI state, or the first target TCI state has a higher CORESET pool index than the second target TCI state; or the first source TCI state has a lower CORESET pool index than the second source TCI state, or the first target TCI state has a lower CORESET pool index than the second target TCI state; or the first source TCI state has a higher timing advance group identification than the second source TCI state, or the first target TCI state has a higher timing advance group identification than the second target TCI state; or the first source TCI state has a lower timing advance group identification than the second source TCI state, or the first target TCI state has a lower timing advance group identification than the second target TCI state; or the first source TCI state or the first target TCI state is associated with a network device for which uplink is configured; or the first source TCI state or the first target TCI state is activated for the first network device which carries a downlink control channel, the first source TCI state for which a worse link quality has been measured than the second source TCI state, or the first target TCI state for which a worse link quality has been measured than the second target TCI state; or the first source TCI state for which a better link quality has been measured than the second source TCI state, or the first target TCI state for which a better link quality has been measured than the second target TCI state; or the first source TCI state for which a worse predicted link quality has been measured than the second source TCI state, or the first target TCI state for which a worse predicted link quality has been measured than the second target TCI state; or the first source TCI state for which a better predicted link quality has been measured than the second source TCI state, or the first target TCI state for which a better predicted link quality has been measured than the second target TCI state; or the first source TCI state is associated with a network device for which a lower power headroom is reported than the second source TCI state, or the first target TCI state is associated with a network device for which a lower power headroom is reported than the second target TCI state; or the first source TCI state is associated with a network device for which a higher power headroom is reported than the second source TCI state, or the first target TCI state is associated with a network device for which a higher power headroom is reported than the second target TCI state.

In some example embodiments, the configuration is comprised in a Radio Resource Control (RRC) message, or one or more Medium Access Control (MAC) Control Element (CE) commands.

In some example embodiments, the configuration is transmitted in a Medium Access Control (MAC) Control Element (CE) command from one of the first network device and the second network device; or the configuration is transmitted in a MAC CE command from one of the first network device and the second network device, the MAC CE command further comprising a TCI state switch command; or the configuration is transmitted in a first MAC CE command from the first network device and a second MAC CE command from the second network device, the first MAC CE command and the second MAC CE command having different priorities.

In some example embodiments, the second apparatus further comprises: means for causing an updated configuration of the order to be transmitted to the first apparatus.

In some example embodiments, the second apparatus further comprises: means for causing the updated configuration to be transmitted in a Medium Access Control (MAC) Control Element (CE) command from one of the first network device and the second network device; or means for causing the updated configuration to be transmitted in a third MAC CE command from the first network device and a fourth MAC CE command from the second network device, the third MAC CE command and the fourth MAC CE command having different priorities.

In some example embodiments, the second apparatus further comprises: means for receiving information of the order from the first apparatus.

In some example embodiments, the information of the order is comprised in a Radio Resource Control (RRC) message or in a Medium Access Control (MAC) Control Element (CE) command.

In some example embodiments, the second apparatus further comprises: means for receiving information of an updated order of the order from the first apparatus, the information of the updated order is comprised in a Medium Access Control (MAC) Control Element (CE) command.

In some example embodiments, the first indication and the second indication are transmitted in a single Medium Access Control (MAC) Control Element (CE) command from one of the first network device and the second network device; or the first indication is transmitted in a MAC CE command from the first network device and the second indication is transmitted in a further MAC CE command form the second network device.

In some example embodiments, the reference signals comprise Synchronization Signal and Physical Broadcast Channel (PBCH) blocks (SSBs).

In some example embodiments, the first apparatus comprises a terminal device.

In some example embodiments, the second apparatus further comprises means for performing other operations in some example embodiments of the method 1300 or the second apparatus 120. In some example embodiments, the means comprises at least one processor; and at least one memory storing instructions that, when executed by the at least one processor, cause the performance of the second apparatus.

Figure 14:
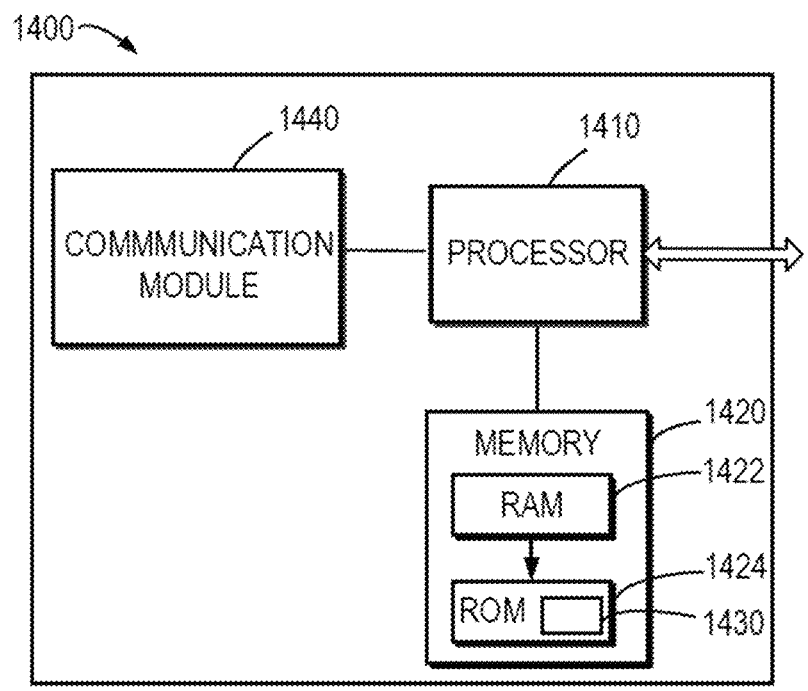
FIG. 14 illustrates a simplified block diagram of a device that is suitable for implementing example embodiments of the present disclosure.

FIG. 14 is a simplified block diagram of a device 1400 that is suitable for implementing example embodiments of the present disclosure. The device 1400 may be provided to implement a communication device, for example, the first apparatus 110 or the second apparatus 120 as shown in FIG. 1. As shown, the device 1400 includes one or more processors 1410, one or more memories 1420 coupled to the processor 1410, and one or more communication modules 1440 coupled to the processor 1410.

The communication module 1440 is for bidirectional communications. The communication module 1440 has one or more communication interfaces to facilitate communication with one or more other modules or devices. The communication interfaces may represent any interface that is necessary for communication with other network elements.

In some example embodiments, the communication module 1440 may include at least one antenna.

The processor 1410 may be of any type suitable to the local technical network and may include one or more of the following: general purpose computers, special purpose computers, microprocessors, digital signal processors (DSPs) and processors based on multicore processor architecture, as non-limiting examples. The device 1400 may have multiple processors, such as an application specific integrated circuit chip that is slaved in time to a clock which synchronizes the main processor.

The memory 1420 may include one or more non-volatile memories and one or more volatile memories. Examples of the non-volatile memories include, but are not limited to, a Read Only Memory (ROM) 1424, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 1422 and other volatile memories that will not last in the power-down duration.

A computer program 1430 includes computer executable instructions that are executed by the associated processor 1410. The instructions of the program 1430 may include instructions for performing operations/acts of some example embodiments of the present disclosure. The program 1430 may be stored in the memory, e.g., the ROM 1424. The processor 1410 may perform any suitable actions and processing by loading the program 1430 into the RAM 1422.

The example embodiments of the present disclosure may be implemented by means of the program 1430 so that the device 1400 may perform any process of the disclosure as discussed with reference to FIG. 1 to FIG. 13. The example embodiments of the present disclosure may also be implemented by hardware or by a combination of software and hardware.

In some example embodiments, the program 1430 may be tangibly contained in a computer readable medium which may be included in the device 1400 (such as in the memory 1420) or other storage devices that are accessible by the device 1400. The device 1400 may load the program 1430 from the computer readable medium to the RAM 1422 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 15:
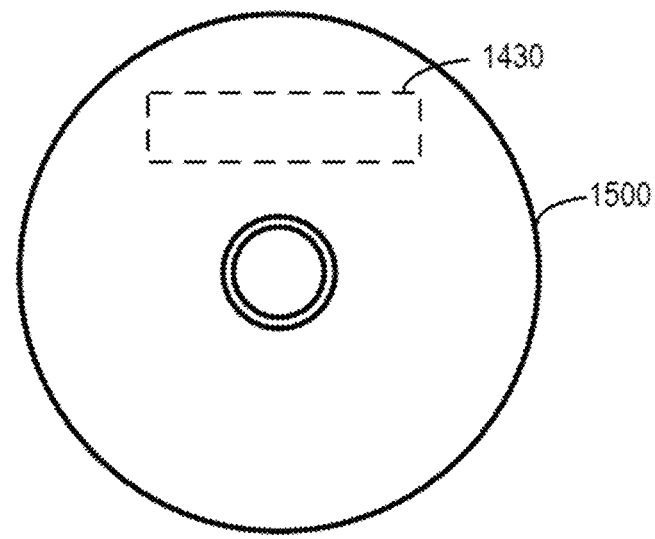
FIG. 15 illustrates a block diagram of an example computer readable medium in accordance with some example embodiments of the present disclosure.

FIG. 15 shows an example of the computer readable medium 1500 which may be in form of CD, DVD or other optical storage disk. The computer readable medium 1500 has the program 1430 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims or any of the below embodiments.

Embodiment 1: A second apparatus comprising: at least one processor; and at least one memory storing instructions that, when executed by the at least one processor, cause the second apparatus at least to: cause a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent.

Embodiment 2: The second apparatus of Embodiment 1, wherein the second apparatus is caused to: transmit, to the first apparatus, a configuration of an order for performing the first switch and the second switch.

Embodiment 3: The second apparatus of Embodiment 2, wherein the order indicates the first switch is to be performed before the second switch in a case that: the first source TCI state has a higher control resource set (CORESET) pool index than the second source TCI state, or the first target TCI state has a higher CORESET pool index than the second target TCI state; or the first source TCI state has a lower CORESET pool index than the second source TCI state, or the first target TCI state has a lower CORESET pool index than the second target TCI state; or the first source TCI state has a higher timing advance group identification than the second source TCI state, or the first target TCI state has a higher timing advance group identification than the second target TCI state; or the first source TCI state has a lower timing advance group identification than the second source TCI state, or the first target TCI state has a lower timing advance group identification than the second target TCI state; or the first source TCI state or the first target TCI state is associated with a network device for which uplink is configured; or the first source TCI state or the first target TCI state is activated for the first network device which carries a downlink control channel, the first source TCI state for which a worse link quality has been measured than the second source TCI state, or the first target TCI state for which a worse link quality has been measured than the second target TCI state; or the first source TCI state for which a better link quality has been measured than the second source TCI state, or the first target TCI state for which a better link quality has been measured than the second target TCI state; or the first source TCI state for which a worse predicted link quality has been measured than the second source TCI state, or the first target TCI state for which a worse predicted link quality has been measured than the second target TCI state; or the first source TCI state for which a better predicted link quality has been measured than the second source TCI state, or the first target TCI state for which a better predicted link quality has been measured than the second target TCI state; or the first source TCI state is associated with a network device for which a lower power headroom is reported than the second source TCI state, or the first target TCI state is associated with a network device for which a lower power headroom is reported than the second target TCI state; or the first source TCI state is associated with a network device for which a higher power headroom is reported than the second source TCI state, or the first target TCI state is associated with a network device for which a higher power headroom is reported than the second target TCI state.

Embodiment 4: The second apparatus of Embodiment 2, wherein the configuration is comprised in a Radio Resource Control (RRC) message, or one or more Medium Access Control (MAC) Control Element (CE) commands.

Embodiment 5: The second apparatus of Embodiment 2, wherein the configuration is transmitted in a Medium Access Control (MAC) Control Element (CE) command from one of the first network device and the second network device; or the configuration is transmitted in a MAC CE command from one of the first network device and the second network device, the MAC CE command further comprising a TCI state switch command; or the configuration is transmitted in a first MAC CE command from the first network device and a second MAC CE command from the second network device, the first MAC CE command and the second MAC CE command having different priorities.

Embodiment 6: The second apparatus of Embodiment 2, wherein the second apparatus is caused to: cause an updated configuration of the order to be transmitted to the first apparatus.

Embodiment 7: The second apparatus of Embodiment 2, wherein the second apparatus is caused to: cause the updated configuration to be transmitted in a Medium Access Control (MAC) Control Element (CE) command from one of the first network device and the second network device; or cause the updated configuration to be transmitted in a third MAC CE command from the first network device and a fourth MAC CE command from the second network device, the third MAC CE command and the fourth MAC CE command having different priorities.

Embodiment 8: The second apparatus of Embodiment 1, wherein the second apparatus is caused to: receive information of the order from the first apparatus.

Embodiment 9: The second apparatus of Embodiment 8, wherein the information of the order is comprised in a Radio Resource Control (RRC) message or in a Medium Access Control (MAC) Control Element (CE) command.

Embodiment 10: The second apparatus of Embodiment 8, wherein the second apparatus is caused to: receive information of an updated order of the order from the first apparatus, the information of the updated order is comprised in a Medium Access Control (MAC) Control Element (CE) command.

Embodiment 11: The second apparatus of any of Embodiments 1 to 10, wherein the first indication and the second indication are transmitted in a single Medium Access Control (MAC) Control Element (CE) command from one of the first network device and the second network device; or the first indication is transmitted in a MAC CE command from the first network device and the second indication is transmitted in a further MAC CE command form the second network device.

Embodiment 12: The second apparatus of any of Embodiments 1 to 11, wherein the reference signals comprise Synchronization Signal and Physical Broadcast Channel (PBCH) blocks (SSBs).

Embodiment 13: The second apparatus of any of Embodiments 1 to 12, wherein the first apparatus comprises a terminal device.

Embodiment 14: A method comprising: receiving a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and determining an order for performing the first switch and the second switch.

Embodiment 15: A method comprising: causing a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent.

Embodiment 16: A first apparatus comprising: means for receiving a first indication indicating a first switch from a first source transmission configuration indicator (TCI) state to a first target TCI state is to be performed, and a second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent; and means for determining an order for performing the first switch and the second switch.

Embodiment 17: A second apparatus comprising: means for causing a first indication and a second indication to be transmitted to a first apparatus, the first indication indicating a first switch from a first source transmission configuration indicator (TCI) state to a first target TCI state is to be performed, and the second indication indicating a second switch from a second source TCI state to a second target TCI state is to be performed, the first source TCI state having been activated for a first network device, and the second source TCI state having been activated for a second network device, wherein reference signals associated with the first target TCI state and the second target TCI state are adjacent.

Embodiment 18: A computer readable medium comprising instructions stored thereon for causing an apparatus at least to perform the method of Embodiment 14 or the method of Embodiment 15.

What is claimed is:

1. A first apparatus comprising:
at least one processor; and
at least one memory storing instructions that, when executed by the at least one processor, cause the first apparatus at least to:
receive a first indication indicating a first switch to a first target transmission configuration indicator (TCI) state is to be performed, and a second indication indicating a second switch to a second target TCI state is to be performed, a first source TCI state having been activated for a first network device, and a second source TCI state having been activated for a second network device, wherein synchronization signal blocks associated with the first target TCI state and the second target TCI state are overlapping or adjacent; and
determine an order for performing the first switch and the second switch,
wherein the first target TCI state is associated with a first control resource set (CORESET) pool index and the second target TCI state is associated with a second CORESET pool index, and
wherein the order for performing the first switch and the second switch is determined such that the first switch is performed before the second switch when it is determined that the first CORESET pool index is higher than the second CORESET pool index.

2. The first apparatus of claim 1, wherein the first apparatus is caused to:
receive, from a second apparatus, a configuration for determining the order for performing the first switch and the second switch; wherein determining the order for performing the first switch and the second switch is based on the configuration.

3. The first apparatus of claim 2, wherein the configuration is comprised in a Radio Resource Control (RRC) message, or one or more Medium Access Control (MAC) Control Element (CE) commands.

4. The first apparatus of claim 2, wherein the first apparatus is caused to:
receive the configuration in a Medium Access Control (MAC) Control Element (CE) command from one of the first network device and the second network device; or
receive the configuration in a MAC CE command from one of the first network device and the second network device, the MAC CE command further comprising a TCI state switch command; or
receive the configuration in a first MAC CE command from the first network device and a second MAC CE command from the second network device, the first MAC CE command and the second MAC CE command having different priorities.

5. The first apparatus of claim 2, wherein the first apparatus is caused to:
receive an updated configuration of the order in a Medium Access Control (MAC) Control Element (CE) command from one of the first network device and the second network device; or
receive the updated configuration of the order in a third MAC CE command from the first network device and a fourth MAC CE command from the second network device, the third MAC CE command and the fourth MAC CE command having different priorities.

6. The first apparatus of claim 1, wherein the first apparatus is caused to:
determine the order based further on at least one of first information about a first transmission between the first network device and the first apparatus or second information about a second transmission between the second network device and the first apparatus.

7. The first apparatus of claim 1, wherein the order is comprised in a Radio Resource Control (RRC) message or in a Medium Access Control (MAC) Control Element (CE) command.

8. The first apparatus of claim 1, wherein the first apparatus is caused to:

receive the first indication and the second indication in a single Medium Access Control (MAC) Control Element (CE) command from one of the first network device and the second network device; or receive the first indication in a MAC CE command from the first network device and the second indication in a further MAC CE command form the second network device.

9. The first apparatus of claim 1, wherein the first apparatus is caused to:

perform a first synchronization for the first switch and a second synchronization for the second switch based on the order.

10. The first apparatus of claim 9, wherein the first apparatus is caused to:

in accordance with a determination that the order indicates the first switch is to be performed before the second switch, receive, after performing the first synchronization and before performing the second synchronization, a transmission from the first network device with the first target TCI state and a transmission from the second network device with the second source TCI state; and receive, after performing the first synchronization and the second synchronization, a transmission from the first network device with the first target TCI state and a transmission from the second network device with the second target TCI state.

11. A method comprising:

receiving, at a first apparatus, a first indication indicating a first switch to a first target transmission configuration indicator (TCI) state is to be performed, and a second indication indicating a second switch to a second target TCI state is to be performed, a first source TCI state having been activated for a first network device, and a second source TCI state having been activated for a second network device, wherein synchronization signal blocks associated with the first target TCI state and the second target TCI state are overlapping or adjacent; and determining, at the first apparatus, an order for performing the first switch and the second switch, wherein the first target TCI state is associated with a first control resource set (CORESET) pool index and the second target TCI state is associated with a second CORESET pool index, and wherein the order for performing the first switch and the second switch is determined such that the first switch is performed before the second switch when it is determined that the first CORESET pool index is higher than the second CORESET pool index.

12. The method of claim 11, further comprising:

receiving, at the first apparatus from a second apparatus, a configuration of the order; and determining, at the first apparatus, the order based on the configuration.

13. The method of claim 12, wherein the configuration is comprised in a Radio Resource Control (RRC) message, or one or more Medium Access Control (MAC) Control Element (CE) commands.

14. The method of claim 12, further comprising:

receiving, at the first apparatus, the configuration in a Medium Access Control (MAC) Control Element (CE) command from one of the first network device and the second network device; or receiving, at the first apparatus, the configuration in a MAC CE command from one of the first network device and the second network device, the MAC CE command further comprising a TCI state switch command; or receiving, at the first apparatus, the configuration in a first MAC CE command from the first network device and a second MAC CE command from the second network device, the first MAC CE command and the second MAC CE command having different priorities.

15. A second apparatus comprising:

at least one processor; and at least one memory storing instructions that, when executed by the at least one processor, cause the second apparatus at least to:

cause a first indication and a second indication to be transmitted to a first apparatus, the first indication indicating a first switch to a first target transmission configuration indicator (TCI) state is to be performed, and the second indication indicating a second switch to a second target TCI state is to be performed, a first source TCI state having been activated for a first network device, and a second source TCI state having been activated for a second network device, wherein synchronization signal blocks associated with the first target TCI state and the second target TCI state are overlapping or adjacent, and determine an order for performing the first switch and the second switch, wherein the first target TCI state is associated with a first control resource set (CORESET) pool index and the second target TCI state is associated with a second CORESET pool index, and wherein the order for performing the first switch and the second switch is determined such that the first switch is to be performed before the second switch when it is determined that the first CORESET pool index is higher than the second CORESET pool index.

* * * * *